United States Patent [19]

Hotta

[11] Patent Number: 5,305,141
[45] Date of Patent: Apr. 19, 1994

[54] BINOCULAR INCLUDING A PREASSEMBLED FOCUSING UNIT

[75] Inventor: Keiichi Hotta, Tokyo, Japan

[73] Assignees: Asahi Kogaku Kogyo Kabushiki Kaisha; Petori Kogyo Kabushiki Kaisha, Tokyo, Japan

[21] Appl. No.: 988,805

[22] Filed: Dec. 10, 1992

Related U.S. Application Data

[60] Division of Ser. No. 648,141, Jan. 30, 1991, Pat. No. 5,196,959, which is a continuation of Ser. No. 546,702, Jul. 2, 1990, Pat. No. 5,071,242, which is a continuation of Ser. No. 225,749, Jul. 29, 1988, abandoned.

[30] Foreign Application Priority Data

| Apr. 26, 1988 | [JP] | Japan | 63-55267 |
| Apr. 26, 1988 | [JP] | Japan | 63-55268 |
| Apr. 29, 1988 | [JP] | Japan | 63-58089 |
| Apr. 30, 1988 | [JP] | Japan | 63-57336 |
| Apr. 30, 1988 | [JP] | Japan | 63-57337 |
| Apr. 30, 1988 | [JP] | Japan | 63-57338 |
| Apr. 30, 1988 | [JP] | Japan | 63-57339 |
| Apr. 30, 1988 | [JP] | Japan | 63-57340 |

[51] Int. Cl.⁵ .............. G02B 7/06; G02B 7/12; G02B 23/00; G02B 23/18
[52] U.S. Cl. ................. 359/416; 359/415
[58] Field of Search .......... 359/414, 415, 416, 411, 359/412, 835, 417, 418, 410

[56] References Cited

U.S. PATENT DOCUMENTS

| 1,016,315 | 2/1912 | Barton . | |
| 1,338,241 | 5/1920 | Meling et al. . | |
| 2,534,776 | 12/1950 | Kershaw et al. | 359/418 |
| 3,049,972 | 8/1962 | Malinowski . | |
| 3,454,773 | 7/1969 | Bulthius et al. . | |
| 4,087,153 | 5/1978 | Hengst . | |
| 4,531,817 | 7/1988 | Sato | 359/414 |
| 4,630,901 | 12/1986 | Althenheiner et al. . | |

FOREIGN PATENT DOCUMENTS

| 2950204 | 7/1980 | Fed. Rep. of Germany . |
| 465592 | 4/1914 | France . |
| 973186 | 9/1950 | France . |
| 63-109915 | 7/1988 | Japan . |
| 63-161424 | 7/1988 | Japan . |

OTHER PUBLICATIONS

Fujinon advertisig brochure, p. 13, shows large high-powered binoculars used for sightseeing.
Tamron Model SQ824 brochure.
Tasco advertising brochure, p. 4.

Primary Examiner—Jon W. Henry
Attorney, Agent, or Firm—Sandler Greenblum & Bernstein

[57] ABSTRACT

A binocular comprising a binocular body, one or a pair of objective lens-barrel unit or units, a pair of eyepiece lens-barrels and a pair of image-erecting chambers. A pair of parallel optical axes pass through the objective lens-barrel unit or units. The image-erecting chambers are arranged between the objective lens-barrel unit or units and the eyepiece lens-barrels. The image-erecting chambers have incorporated therein their respective prism units for optically connecting the optical axes of the objective lens-barrel unit or units to respective optical axes of the eyepiece lens-barrel units. Each of the image-erecting chambers is associated with the binocular body for angular movement relative thereto about a corresponding one of the optical axes of the objective lens-barrel unit or units in such a manner that the optical axes of the respective eyepiece lens-barrel units are movable angularly toward and away from each other respectively about the optical axes of the objective lens-barrel unit or units.

6 Claims, 28 Drawing Sheets

BINOCULAR INCLUDING A PREASSEMBLED FOCUSING UNIT

This application is a division of application No. 07/648,141, filed Jan. 30, 1991 now U.S. Pat. No. 5,196,959, which is a continuation of application No. 07/546,702, filed Jul. 2, 1990, which issued as U.S. Pat. No. 5,071,242, on Dec. 10, 1991; which is a continuation of application No. 07/225,749, filed Jul. 29, 1988, now abandoned.

BACKGROUND OF THE INVENTION

This invention related generally to binoculars, and more particularly, to a binocular comprising a pair of image-erecting chambers each having incorporated therein a Porro prism or a Porro mirror.

In general, a binocular comprises a pair of right- and left-hand lens-barrels units. Each of the lens-barrel units includes an objective lens-barrel having incorporated therein an objective lens system, and an eyepiece lens-barrel having incorporated therein an eyepiece lens system. The objective lens system has an optical axis extending in coaxial relation to that of the eyepiece lens-barrel.

The binocular comprises an intereyepiece-distance adjusting mechanism for adjusting the distance between the eyepiece lens systems of the respective lens-barrel units to match the distance between the observer's eyes. The adjusting mechanism includes a single-shaft type or a two-shaft type.

FIG. 1 of the accompanying drawings illustrates an example of a prior art binocular of single-shaft type. The binocular comprises a pair of lens-barrel units 11 and 12 having their respective eyepiece lens-barrels 11a and 12a. Support arms 11b and 12b of the respective lens-barrel units 11 and 12 are mounted on a hollow support shaft 14 for angular movement about an axis thereof. The support shaft 14 is mounted on a focusing central shaft 13 in concentric relation thereto. The arrangement is such that the pair of lens-barrel units 11 and 12 are moved toward and away from each other angularly about the axis of the support shaft 14, thereby adjusting the distance between the eyepiece lens-barrels 11a and 12a to match the distance between the observer's eyes.

The central shaft 13 has an operating roller 15 threadedly engaged on one end thereof. A pair of levers 16 and 17 are mounted on the other end portion of the central shaft 13 for angular movement about the axis of the central shaft 13 but precluding movement along the axis of the central shaft 13. Angular movement of the operating roller 15 causes the central shaft to be moved within the hollow support shaft 14 along the axis thereof, so that the pair of levers 16 and 17 are also moved together with the central shaft 13. Movement of the levers 16 and 17 in turn causes the pair of eyepiece lens-barrels 11a and 12a to be moved relatively to the respective objective lens-barrels, thereby adjusting the focus of the binocular.

The binocular described above with reference to FIG. 1 is relatively complicated in structure, and is relatively cumbersome in assembling the various component parts. Specifically, the support shaft 14 swingably supporting the pair of lens-barrel units 11 and 12, and the central shaft 13 for adjustment of the focus are formed into a double-shaft structure. In addition, the right- and left-hand levers 16 and 17 for adjustment of the focus are mounted on the central shaft 13. In this manner, the intereyepiece-distance adjusting mechanism and the focusing mechanism are assembled in a united fashion. By this reason, the binocular is complicated in structure and is troublesome in assembling the various component parts.

FIGS. 2 and 3 illustrate an example of a binocular of two-shaft type. The binocular comprises a prior art body 22 and a pair of lens-barrel units 21 and 24. A pair of transmission shafts 23 and 25 are mounted to the body 22. The pair of lens-barrel units 21 and 24 are mounted respectively to the transmission shafts 23 and 25 for angular movement about their respective axes, thereby adjusting the distance between optical axes of the respective lens-barrel units 21 and 24.

Specifically, the transmission shaft 23 has one end thereof which extends into a hinge section 21a of the lens-barrel unit 21 which is located adjacent the objective lens system. A small ball 30 is arranged at a hinge section 21b of the lens-barrel unit 21 which is located adjacent the eyepiece lens system. These hinge sections 21a and 21b form a support for the transmission shaft 23. The right-hand lens-barrel unit 24 is constructed in the same manner as the left-hand lens-barrel unit 21.

A cross-plate 26 is arranged within the body 22 and has opposite ends which engage respectively with the transmission shafts 23 and 25. The cross-plate 26 is threadedly engaged at its center with a spindle 28 which is angularly movable about its axis together with an operating roller 27.

Angular movement of the operating roller 27 causes the spindle 28 to be moved angularly about its axis so that the cross-plate 26 is moved along the axis of the spindle 28. By the movement of the cross-plate 26, the transmission shafts 23 and 25 are moved along their respective axes. The movement of the transmission shaft 23 along it axis is transmitted to the objective lens-barrel of the left-hand lens-barrel unit 21 through an interlocking arm 29, to displace the objective lens-barrel relative to the eyepiece lens-barrel, thereby adjusting the focus of the left-hand lens-barrel unit 21. The right-hand lens-barrel unit 24 is also adjusted in focus in the same manner as the left-hand lens-barrel unit 24.

The binocular of two-shaft type illustrated in FIGS. 2 and 3 has problems similar to those of the binocular of single-shaft type described previously. That is, the two transmission shafts 23 and 25 serve as a pivoting arrangement for adjustment of the intereyepiece distance, and also serve as a driving-force transmitting arrangement for adjustment of the focus. Thus, also in the binocular shown in FIGS. 2 and 3, the intereyepiece-distance adjusting mechanism and the focusing mechanism are assembled in a united fashion.

As described above, the arrangement of the conventional binocular is such that in the case of the single-shaft type, the pair of lens-barrel units are angularly moved about a pivotal axis parallel to the optical axes of the respective lens-barrel units, while in the case of the two-shaft type, the pair of lens-barrel units are angularly moved respectively about a pair of pivotal axes parallel to the respective optical axes of the lens-barrel units in order to adjust the intereyepiece distance to match the distance between the observer's eyes. Because of the arrangement of the conventional binocular, when the pair of lens-barrel units are moved angularly toward and away from each other to adjust the intereyepiece distance, the optical axes of the respective objective lens systems are also moved angularly, resulting in a variation in the distance between the optical axes of the respective objective lens systems. This makes it difficult to regulate the pair of optical axes with a high accuracy in assembling of the binocular. Moreover, it is impossible to incorporate a flat plate-like polarizing filter or the like in the binocular in relation common to the pair of lens-barrel units.

SUMMARY OF THE INVENTION

It is therefore an object of this invention to provide an improved binocular capable of maintaining the distance between the pair of objective lens systems constant regardless of adjustment of the intereyepiece distance.

For the above purpose, according to the invention, there is provided a binocular comprising:

a binocular body;

a lens-barrel having an objective lens positioned within the barrel, the objective lens-barrel being mounted on the binocular body and having a pair of optical axes passing through the objective lens in parallel relation to each other;

a pair of eyepiece lens-barrels including respective eyepiece lenses, each eyepiece lens having respective optical axes extending parallel and offset to the respective optical axes of the objective lens; and a pair of image-erecting chamber, each chamber being arranged between an objective lens-barrel and a corresponding one of the eyepiece lens-barrels, the eyepiece lens-barrels being mounted, respectively, onto the pair of image-erecting chambers, thereby forming an eyepiece lens-barrel unit, the pair of image-erecting chambers including respective optical means for optically connecting the optical axes of the objective lens with the optical axes of the respective eyepiece lens means, wherein each of the pair of image-erecting chambers is adapted to angularly move with respect to the binocular body, about a corresponding one of the pair of optical axes of the objective lens in such a manner that the optical axes of the respective eyepiece lens are movable respectively toward and away from each other about the pair of optical axes of the objective lenses.

BRIEF DESCRIPTION OF THE ACCOMPANYING DRAWINGS

DESCRIPTION OF THE EMBODIMENT

Figure 13:
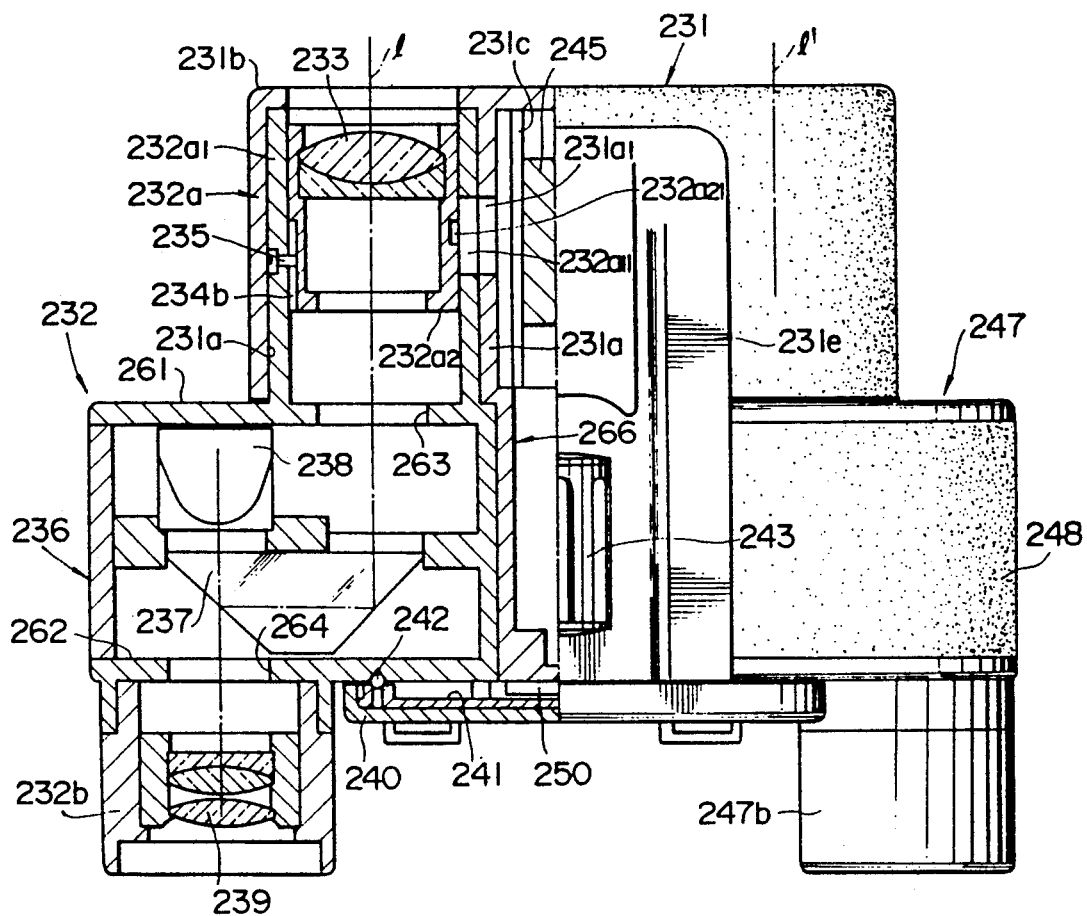
FIG. 13 is a partially cross-sectioned top plan view of a binocular according to another modification of the invention, FIG. 13 being a cross-sectional view taken along the line XIII—XIII in FIG. 14.

Referring first to FIGS. 4 through 8, there is shown a binocular embodying the invention, which comprises a binocular body 101 and a pair of left- and right-hand lens-barrel units 106 and 107 mounted to the body 101 for angular movement relative thereto independently of each other. The left-hand lens-barrel unit 106 is composed of an objective lens-barrel 106b, an eyepiece lens-barrel 106d and an image-erecting chamber section 106c arranged between them. The objective lens-barrel 106b is fixedly connected to the image-erecting chamber section 106c. The objective lens barrel 106b has incorporated therein an objective lens system 121a, while the eyepiece lens barrel 106d has incorporated therein an eyepiece lens system 122a. The image-erecting chamber section 106c has incorporated therein a Porro mirror or a Porro prism system like that illustrated in, for example, FIG. 13 subsequently to be described. The prism system within the image-erecting chamber section 106c serves to optically connect an optical axis l of the objective lens system 121a to an optical axis of the eyepiece lens system 122a. The right-hand lens-barrel unit 107 is constructed in a manner similar to that of the left-hand lens-barrel unit 106 described above. The pair of lens-barrel units 106 and 107 are mounted to the body 101 for angular movement relative thereto about the respective optical axes l and l' of the objective lens systems 121a and 121b subsequently to be described.

Figure 1:
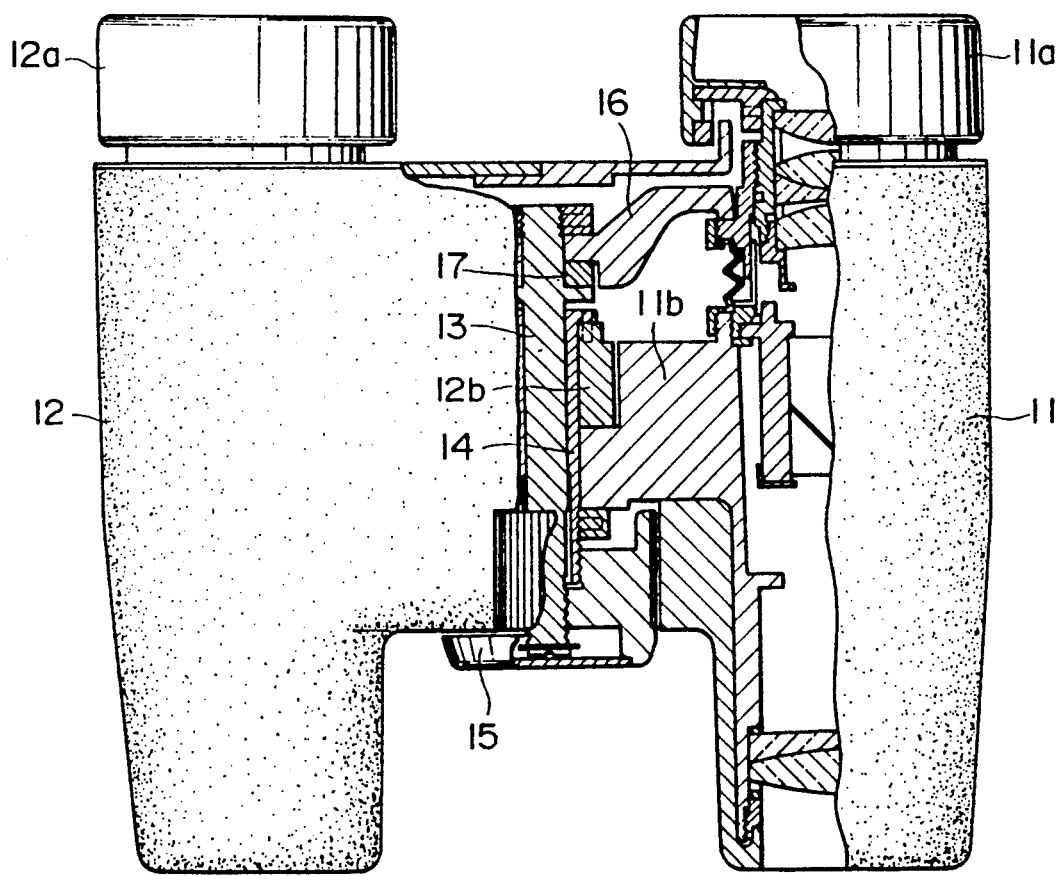
FIG. 1 is a partially broken-away top plan view of a binocular of single-shaft type according to the prior art.
Figure 2:
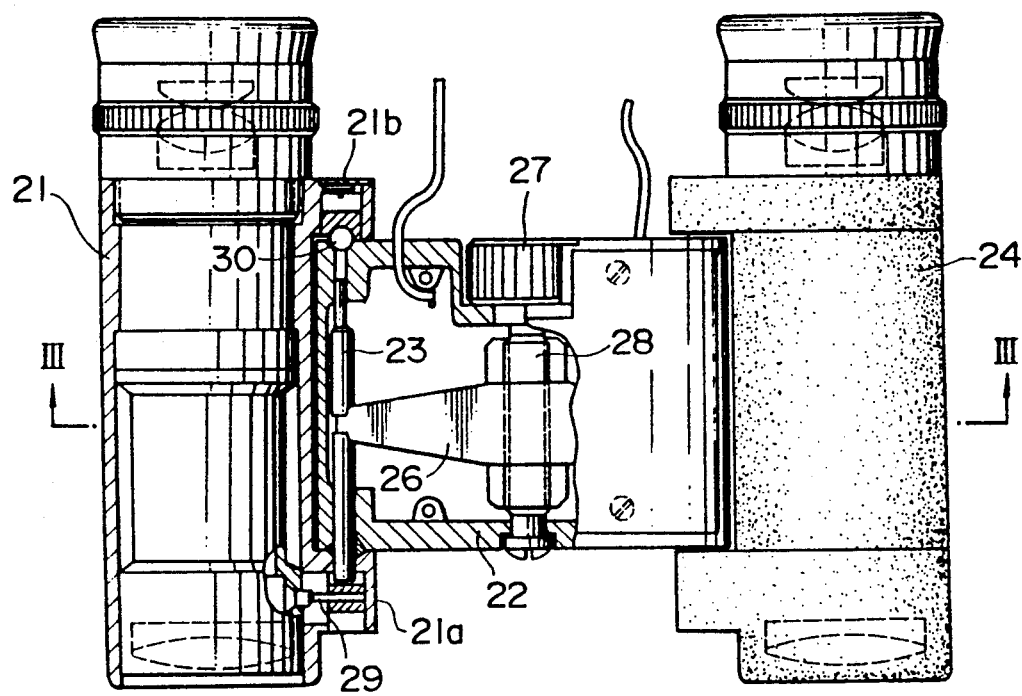
FIG. 2 is a partially broken-away top plan view of a binocular of two-shaft type according to the prior art.
Figure 3:
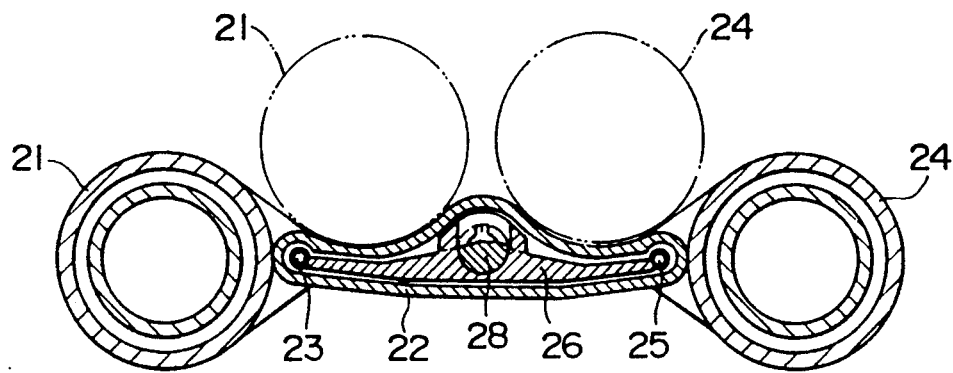
FIG. 3 is a cross-sectional view taken along the line III—III in FIG. 2.
Figure 4:
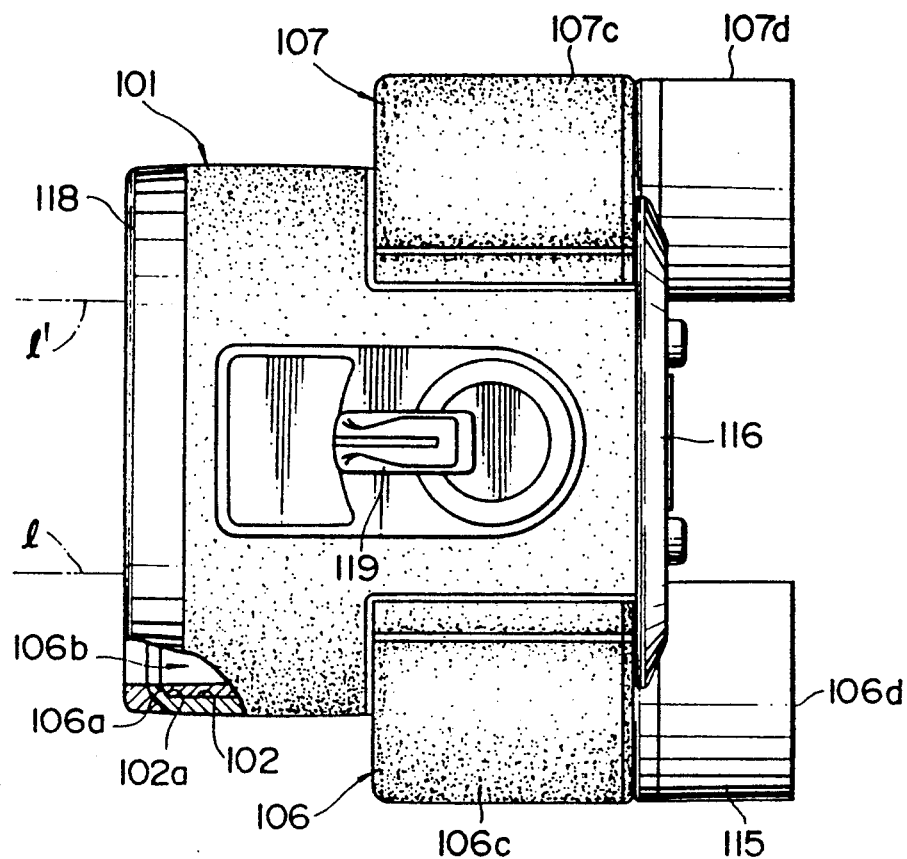
FIG. 4 is a partially broken-away top plan view of a binocular embodying the invention.
Figure 8:
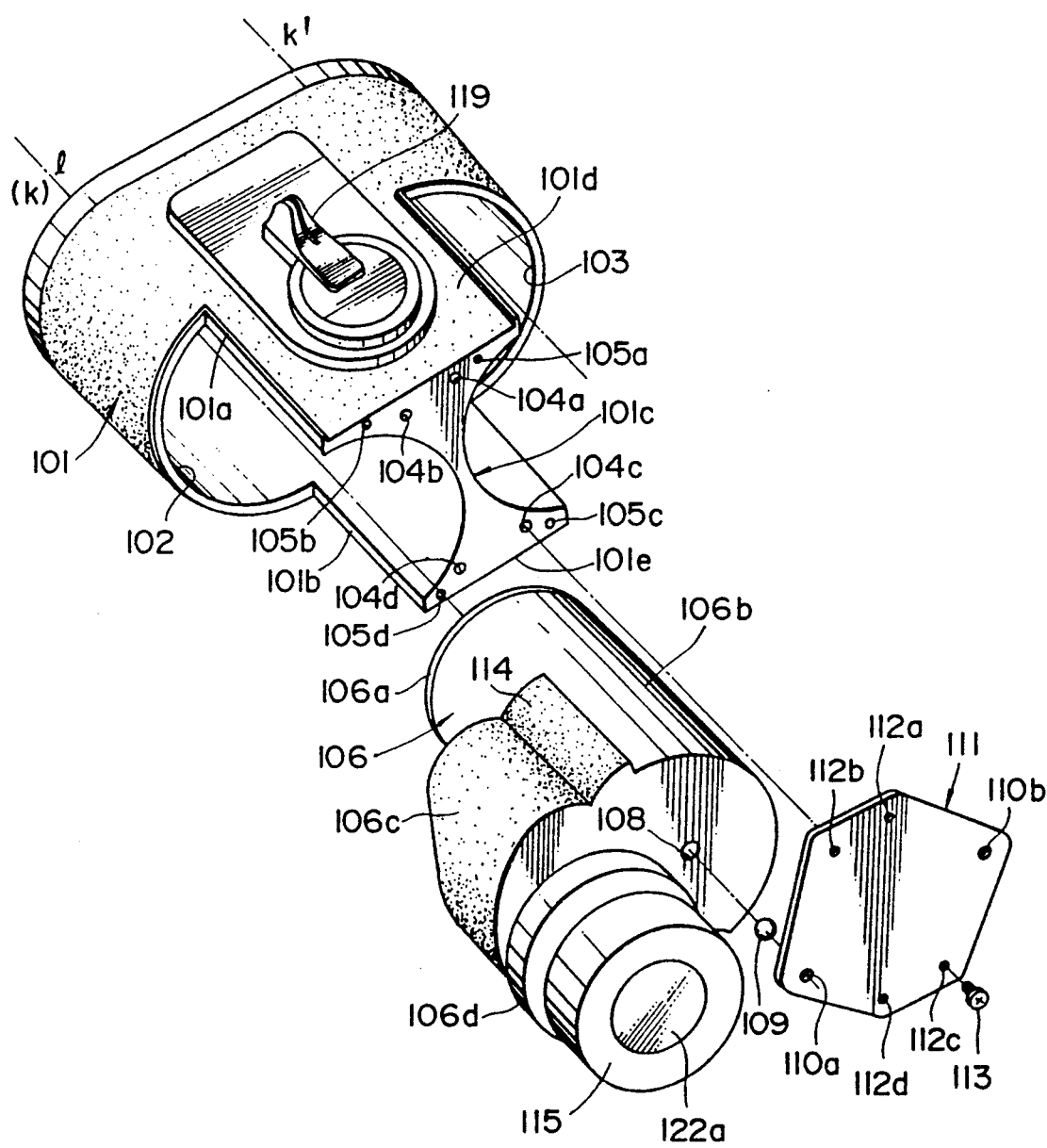
FIG. 8 is an exploded perspective view of the binocular illustrated in FIGS. 4 through 7, with the right-hand lens-barrel unit omitted from illustration.

As clearly shown in FIG. 8, the body 101 is formed therein with a pair of retaining bores 102 and 104 having their respective axes k and k' which extend parallel to each other. Each of the retaining bores 102 and 103 has one end portion thereof adjacent a corresponding one of the pair of eyepiece lens-barrels 106c and 107c. A peripheral wall of the end portion of the retaining bore 32, 33 is cut out partially to form a pair of cut-out edges 101a and 101b. Although not only the retaining bore 102 is shown in FIG. 4, the other end portion of the retaining bore 102 has an inner peripheral surface 102a which is so tapered as to converge. The retaining bore 103 is also provided with a tapered inner peripheral surface portion similar to the tapered surface 102a. The binocular body 101 has an intermediate wall 101c extending between upper and lower surfaces 101d and 101e of the body 101. The intermediate wall 101c is located between the pair of retaining bores 102 and 103 and extends along their respective axes k and k'. The intermediate wall 101c has an end face formed therein with two upper and lower pairs of threaded bores 104a and 104b and 104c and 104c for a support plate 111 of a support mechanism, and two upper and lower threaded bores 105a and 105b and 105c and 105d for a cover plate 116, subsequently to be described.

Figure 6:
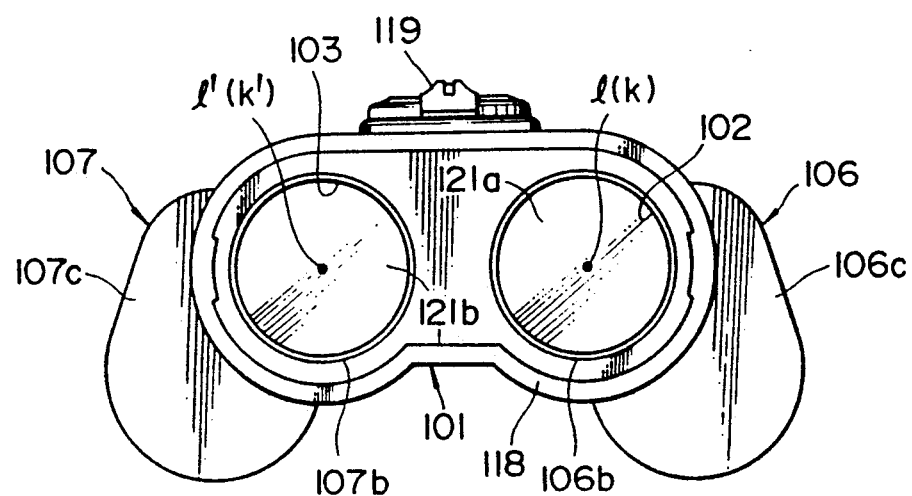
FIG. 6 is a front elevational view of the binocular illustrated in FIG. 4 as viewed from the side of a pair of objective lens-barrels.

As will be seen from FIGS. 4 and 6, the objective lens-barrels 106b and 107b of the respective lens-barrel units 106 and 107 are fitted respectively in the retaining bores 32 and 33 in such a manner that the axes k and k' of the respective objective lens-barrels 106b and 107b are coincident respectively with the optical axes l and l' of the respective objective lens systems 121a and 121b. As shown in FIG. 4, the objective lens-barrel 106b has one end portion thereof remote from the image-erecting chamber section 106c. The end portion of the objective lens-barrel 106b has an outer peripheral surface 106a which is tapered in complementary relation to the tapered inner peripheral surface 102a of the end portion of the retaining bore 102. The tapered outer peripheral surface 106a of the objective lens barrel 106b is in sliding contact with the tapered inner peripheral surface 102a of the retaining bore 102. It is needless to say hat the right-hand objective lens-barrel 107b is also provided with a tapered outer peripheral surface portion similar to the tapered surface 106a. In this manner, the pair of lens-barrel units 106 and 107 are mounted to the binocular body 101 for angular movement about the respective optical axes l and l' of the objective lens systems 121a and 121b. Moreover, sliding contact between the tapered surfaces 102a and 106a ensures smooth angular movement of the lens-barrel units 106 and 107 relative to the binocular body 101.

The lens-barrel units 106 and 107 and the support mechanism therefore will next be described in more detail. The lens-barrel units 106 and 107 are similar in construction to each other, except that they are symmetrical in configuration to each other, and only the lens-barrel unit 106 will therefore be described.

As shown in FIG. 8, the lens-barrel unit 106 is composed of the objective lens-barrel 106b, the image-erecting chamber section 106c and the eyepiece lens-barrel 106d. The lens-barrel unit 106 is mounted to the body 101 such that the axis k of the objective lens-barrel 106b is coincident with the optical axis l of the objective lens system 121a and in such a manner that the lens-barrel unit 106 is movable angularly about the optical axis l of the objective lens system 121a. The image-erecting chamber section 106c has an end face remote from the objective lens-barrel 106b. The end face of the image-erecting chamber section 106c is formed with a conical recess 108 at a location on an extension line of the optical axis l. On the other hand, the support plate 111 is formed therein with a receiving bore 110a which cooperates with the recess 108 to receive therein a bearing element or a ball 109 in a rolling manner. The support plate 111 is also provided with two upper and lower pairs of through bores 112a and 112b and 112c and 112d which correspond respective to the threaded bores 104a, and 104b, 104c and 104d. The support plate 111 is mounted to the end face of the intermediate wall 101c of the body 101 by means of screws 113, with the ball 109 received in and clamped between the recess 108 and the receiving bore 110a. In this manner, the lens-barrel unit 106 is supported by the body 101 and the support plate 111 for angular movement relative to the body 101 about the optical axis l of the objective lens system 121a.

Figure 7:
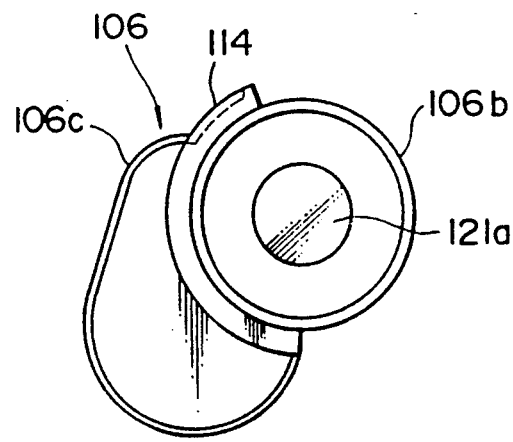
FIG. 7 is a fragmentary view of one of the pair of objective lens-barrels illustrated in FIGS. 5 and 6.

As shown in FIGS. 7 and 8, an arcuate projection 114 is provided on the outer periphery of the objective lens-barrel 106b and extends along the end face of the image-erecting chamber section 106c remote from the eyepiece lens-barrel 106d. The arcuate projection 114 has its opposite ends capable of being abutted respectively against the cut-out edges 101a and 101b which serve to regulate a range of angular movement of the lens-barrel unit 106 relative to the body 101 about the optical axis l of the objective lens system 121a.

As shown in FIGS. 4 and 8, the eyepiece, lens-barrel 106d l is covered with an eyepiece cover 115.

The lens-barrel unit 107 is constructed in a manner similar to the lens-barrel unit 106 described above. That is, a receiving bore 110b in the support plate 111 is employed to partially receive a ball so as to support the lens-barrel unit 107 for angular movement relative to the body 101 about the optical axis l' of the objective lens system 121b.

Figure 5:
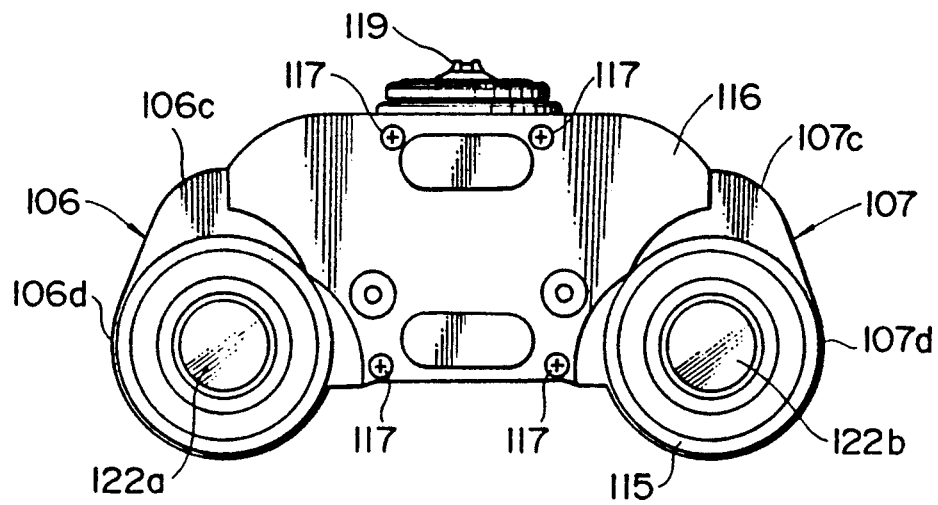
FIG. 5 is a rear elevational view of the binocular illustrated in FIG. 4 as viewed from the side of a pair of eyepiece lens-barrels.

As shown in FIGS. 4 and 5, a rear cover plate 116 is mounted to the end face of the intermediate wall 101c of the body 101 by means of screws 117 screwed into the threaded bores 105a through 105d, in order to conceal the support plate 111. Moreover, as shown in FIGS. 4 and 6, a front cover 118 is attached to an end of the body 101 adjacent the objective lens-barrels 106b and 107b.

a lever 119 is mounted on the upper surface 101d of the body 101 for angular movement relative thereto about an axis extending perpendicularly to the optical axes l and l' of the respective objective lens systems 121a and 121b. The lever 119 is operatively connected to a pair of inner tubular members of the respective objective lens-barrels 106b and 107b. The inner tubular members have incorporated therein their respective objective lens systems 121a and 121b, and are movable relative to respective outer tubular members of the objective lens-barrels 106b and 107b along the respective optical axes l and l' of the optical lens systems 121a and 121b in a manner similar to that subsequently to be described with reference, for example, to FIG. 13. Angular movement of the lever 119 causes the inner tubular members to move relative to the respective outer tubular members, thereby adjusting the focus of the binocular.

In the binocular constructed as described above, when it is desired to adjust the distance between the pair of eyepiece lens-barrels 106d and 107d to match the distance between the observer's eyes, the eyepiece lens-barrels 106d and 107d are moved toward and away from each other angularly about the respective pivotal axes which are coincident respectively with the optical axes l and l' of the objective lens systems 121a and 121b. The optical axes l and l' are always maintained stationary during angular movement of the eyepiece lens-barrels 106d and 107d, and the distance between the optical axes l and l' is maintained unchanged. This makes it easy to regulate the pair of optical axes l and l' with a high accuracy during assembling of the binocular. Moreover, it is possible to incorporate a flat plate-like polarizing filter or the like in the binocular in a common relation to the pair of lens-barrel units 106 and 107. Moreover, since the binocular body 101 is maintained stationary during adjustment of the distance between the intereyepiece distance, the binocular body 101 can be provided in its lower surface 101e with an attaching bore for a tripod.

FIGS. 9 through 12 show a modified form of the binocular according to the invention. In these figures, components and parts like or similar to those illustrated in FIGS. 4 through 8 are designated by the same or like reference numerals, and the description of such like or similar components and parts will therefore be omitted to avoid repetition.

The binocular illustrated in FIGS. 9 through 12 is different from the binocular shown in FIGS. 4 through 8 in that an interlocking mechanism is arranged between the pair of lens-barrel units 106 and 107 for interlocking them with each other in such a manner as to enable the pair of eyepiece lens-barrels 106d and 107d to be moved angularly in their respective directions opposite to each other respectively about the optical axes 1 and 1' of the respective objective lens systems 121a and 121b.

Figure 9:
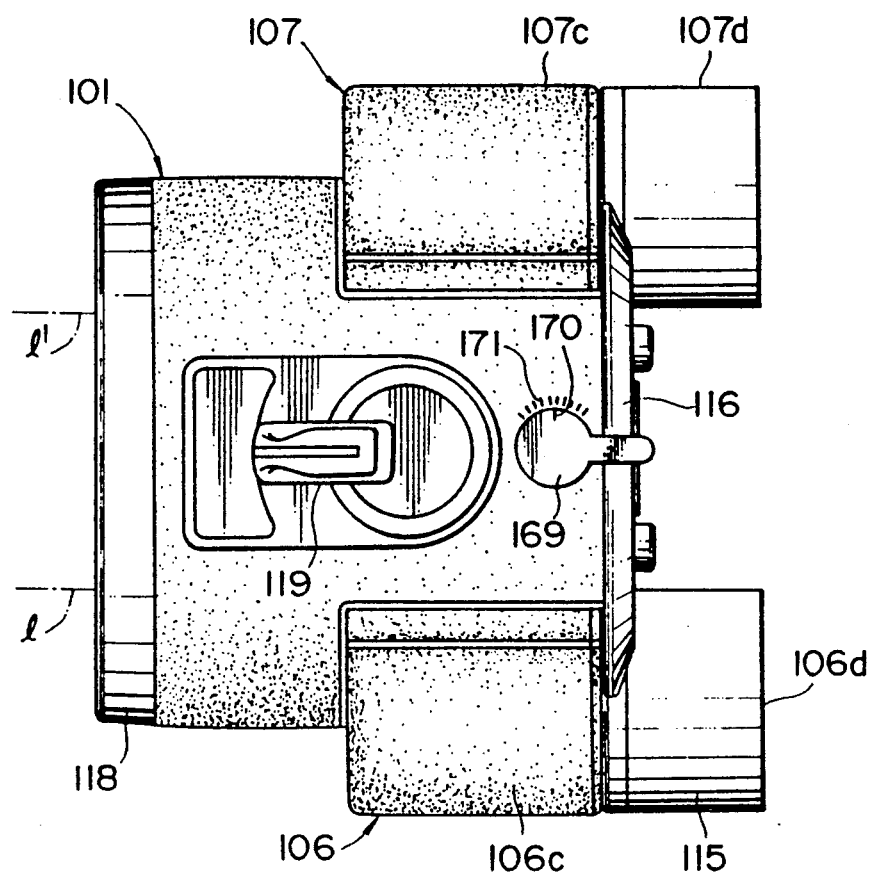
FIG. 9 is a top plan view of a binocular according to a modification of the invention.
Figure 10:
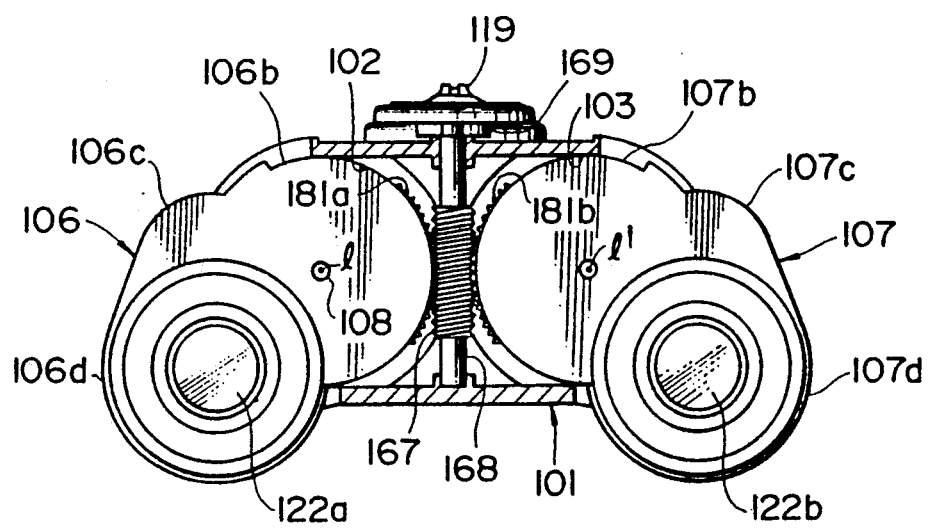
FIG. 10 is a partially broken-away rear elevational view of the binocular illustrated in FIG. 9 as viewed from the side of a pair of eyepiece lens-barrels, showing an interlocking mechanism.
Figure 11:
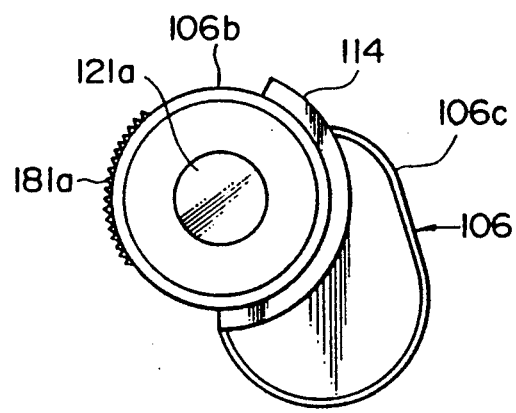
FIG. 11 is a fragmentary view of one of the eyepiece lens-barrels shown in FIG. 10.
Figure 12:
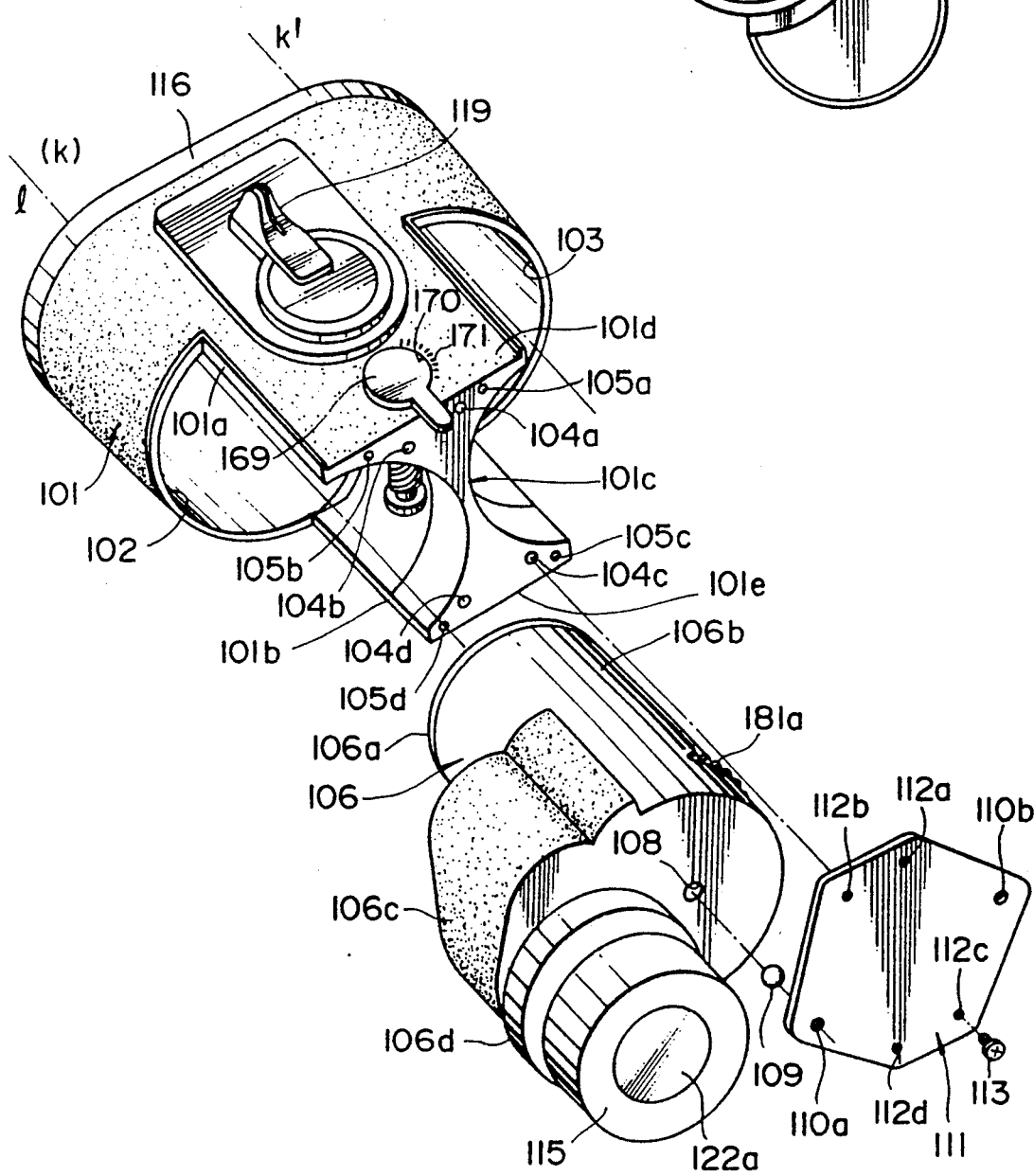
FIG. 12 is an exploded perspective view of the binocular illustrated in FIG. 9, with a right-hand lens-barrel unit omitted from illustration.

Specifically, the interlocking mechanism comprises a drive shaft 168 formed with a worm 167. The drive shaft 168 is rotatably mounted to the intermediate wall 101c of the binocular body 101 and has an axis extending perpendicularly to the optical axes 1 and 1' of the respective objective lens systems 121a and 121b. The drive shaft 168 ha an upper end portion thereof which projects from the upper surface 101d of the intermediate wall 101c. An operating member 169 is fixedly mounted to the projecting end portion of the drive shaft 168. As shown in FIGS. 9 and 12, the operating member 169 is provided on its upper face with an index 170, while graduations 171 are provided on the upper surface 101d of the body 101. The arrangement is such that angular movement of the operating lever 169 causes the drive shaft 168 to be moved angular about its axis in the same direction and by the same amount of angular movement as the operating lever 169. The position of the index 170 relative to the graduations 171 makes it possible to read the direction of the angular movement and the amount of angular movement.

The interlocking mechanism further includes a pair of arcuate groups of gear teeth 181a and 181b formed respectively on the outer peripheries of the pair of image-erecting chamber sections 106c and 107c. The gear teeth 181a and 181b are in mesh with the worm 167. The arrangement is such that the pair of lens-barrel units 106 and 107 are angularly moved in interlocked relation to each other about the respective optical axes 1 and 1' of the objective lens systems 121a and 121b in the clockwise or counterclockwise direction as viewed in FIG. 10, in accordance with the direction movement and the amount of angular of the operating lever 169.

As described above, the binocular illustrated in FIGS. 9 through 12 is advantageous in that operation of the operating lever 169 makes it easy to adjust the distance between the pair of eyepiece lens barrels 106d and 107d, in addition to the same advantages as the binocular illustrated in FIGS. 4 through 8.

FIGS. 13 through 18 show another modified form of the binocular according to the invention, which comprises a binocular body 231 and a pair of left- and right-hand lens-barrel units 232 and 247 mounted to the body 231 for angular movement relative thereto subsequently to be described in detail. The left-hand lens-barrel unit 232 is composed of an objective lens-barrel 232a, an eyepiece lens-barrel 232b and an image-erecting chamber section 236. The image-erecting chamber section 236 has an elliptical outer casing and is arranged between the objective lens-barrel 232a and the eyepiece lens-barrel 232b. The objective lens-barrel 232a is cylindrical in shape and is composed of an outer tubular member $232a_1$ and an inner tubular member $232a_2$. The outer tubular member $231a_1$ is fixedly connected to the outer casing of the image-erecting chamber section 236, and, in case of the illustrated modification, is formed in integral relation to the outer casing of the image-erecting chamber section 236. The inner tubular member $232a_2$ has incorporated therein an objective lens system 233. The inner tubular member $232a_2$ is accommodated within the outer tubular member $232a_1$ in concentric relation thereto so as to prevent angular movement relative to the outer tubular member $232a_1$ about an axis of the inner tubular member $232a_2$, but allowing reciprocal movement relative to the outer tubular member $232a_1$ along the axis of the inner tubular member $232a_2$.

Figure 15:
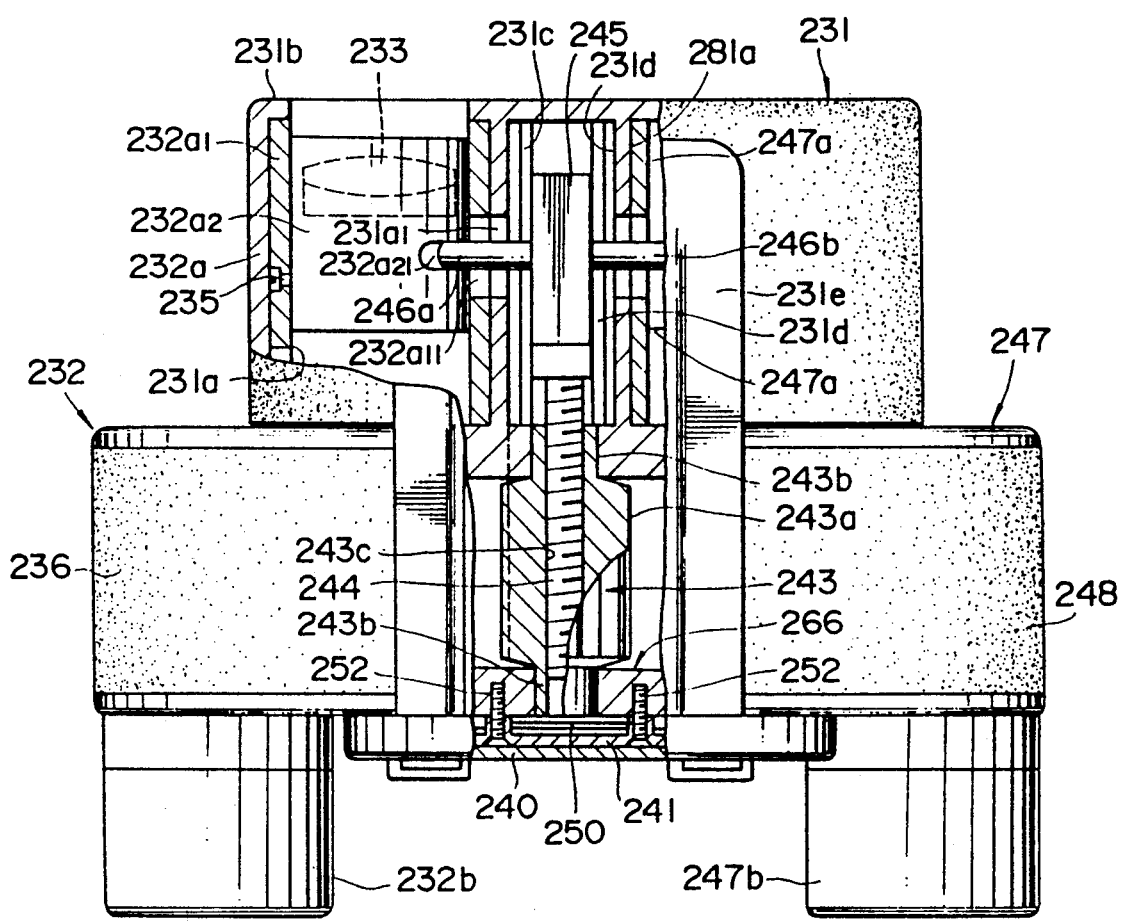
FIG. 15 is a partially broken-away top plan view of the binocular illustrated in FIG. 13, showing a focusing mechanism.

The binocular body 231 is formed therein with a pair of retaining bores 231a and 281a (see FIG. 15). The objective lens-barrel 232a is accommodated in the retaining bore 231a such that the outer tubular member $232a_1$ of the objective lens-barrel 232a is angularly movable relatively to the binocular body 231 about the optical axis 1 of the objective lens system 233. The binocular body 231 is provided with an annular flange 231b at an end of the retaining bore 231a remote from the image-erecting chamber section 236. The outer tubular member $232a_1$ has a forward end remote from the image-erecting chamber section 236, which abuts against the annular flange 231b.

The inner tubular member $232a_2$ having incorporated therein the objective lens system 233 is received within the outer tubular member $232a_1$ for sliding movement relative thereto along the optical axis 1 of the objective lens system 233. The inner tubular member $232a_2$ is formed, in an outer periphery thereof, with an elongated groove 234b extending along the optical axis 1 of the objective lens system 233. A pin 235 is mounted to the outer tubular member $232a_1$ and has a forward end portion which is received in the elongated groove 234b to prevent the inner tubular member $232a_2$ from being angularly moved relatively to the outer tubular member $232a_1$ about the optical axis 1 of the objective lens system 233. The inner tubular member $232a_2$ is designed to be moved reciprocatively along the optical axis 1 of the objective lens system 233 by a focusing mechanism subsequently to be described.

The image-erecting chamber section 236 has incorporated therein a pair of prism systems 237 and 238 for erecting an image and for optically connecting the optical axis 1 of the objective lens system 233 to an optical axis of an eyepiece lens system 239 incorporated in the eyepiece lens barrel 232b. The image-erecting chamber section 236 has one end wall 261 to which the outer tubular member $232a_1$ is fixedly connected. The one end wall 261 is formed therein with a bore 263 aligned with the optical axis 1 of the objective lens system 233. A bore 264 formed in the other end wall 262 of the image-erecting chamber section 236 is aligned with the optical axis of the eyepiece lens system 239.

The binocular body 231 is provided with a substantially hollow intermediate wall structure 266 arranged between the pair of retaining bores 231a and 281a. The intermediate wall structure 266 has a portion thereof projecting from a plane including end faces of the respective retaining bores 231a and 281a, toward the eyepiece lens barrels 232b and 247b. A support plate 241 formed of elastic material is mounted to an end face of the projecting portion of the intermediate wall structure 266 by means of screws 252. A rear cover 240 is also mounted to the end face of the projecting portion of the intermediate wall structure 266 so as to cover the support plate 241.

Figure 17:
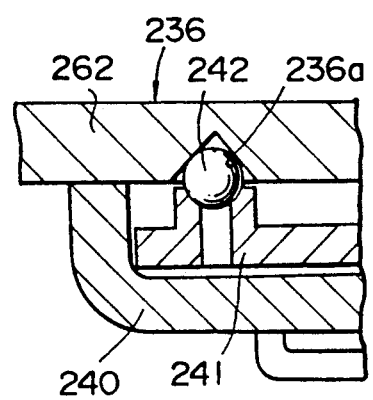
FIG. 17 is an enlarged fragmentary cross-sectional view showing a support plate and one of a pair of bearing elements incorporated in the binocular illustrated in FIG. 13 through 16.

The support plate 241 is designed to urge the outer tubular member $232a_1$ of the objective lens-barrel 232a through the image-erecting chamber section 236 so that the forward end of the outer tubular member 232$a_1$ is abutted against the annular flange 231$b$ on the binocular body 231. Specifically, as shown in FIG. 17, a conical recess 236$a$ is formed in the face of the end wall 262 of the image-erecting chamber section 236 at a location on an extension line of the optical axis 1 of the objective lens system 233. A bearing element or a ball 242 is partially received in the recess 236$a$ and is resiliently or elastically urged against the recess 236$a$ by the support plate 241.

The focusing mechanism comprises an operating roller 243 for moving the inner tubular member 232$a_2$ relatively to the outer tubular member 232$a_1$ along the optical axis 1 of the objective lens system 233. As shown in FIG. 15, the operating roller 243 is composed of a roller body 243$a$ and a threaded shaft 244 having a pair of shaft sections 243$b$ and 243$b$ projecting respectively from the opposite end faces of the roller body 243$a$. The shaft sections 243$b$ and 243$b$ of the operating roller 243 are rotatably supported by the binocular body 231. A threaded bore 243$c$ is formed in the operating roller 243 and extends through the roller body 243$a$ and the pair of shaft sections 243$b$ and 243$b$. The threaded shaft 244 is threadedly engaged with the threaded bore 243$c$ in concentric relation to the operating roller 243 in such a manner that angular movement of the operating roller 243 about its axis causes the threaded shaft 244 to be reciprocally moved relatively to the operating roller 243 along the axis thereof.

A movable block member 245 is mounted to an end portion of the threaded shaft 244 remote from the operating roller 243 so that it is prevented from angular movement relative to the threaded shaft 244 about the axis thereof. A pair of interlocking arms 246$a$ and 246$b$ have their respective one ends fixedly mounted to the movable block member 245. The interlocking arm 246$a$ extends laterally through an opening 231$a_1$ formed in the wall of the retaining bore 231$a$ and through an opening 232$a_{11}$ formed in the outer tubular member 232$a_1$ of the objective lens-barrel 232$a$. The interlocking arm 246$a$ has a forward end which is received in an arcuate groove 232$a_{21}$ formed in the outer periphery of the inner tubular member 232$a_2$ of the objective lens-barrel 232$a$.

Figure 16:
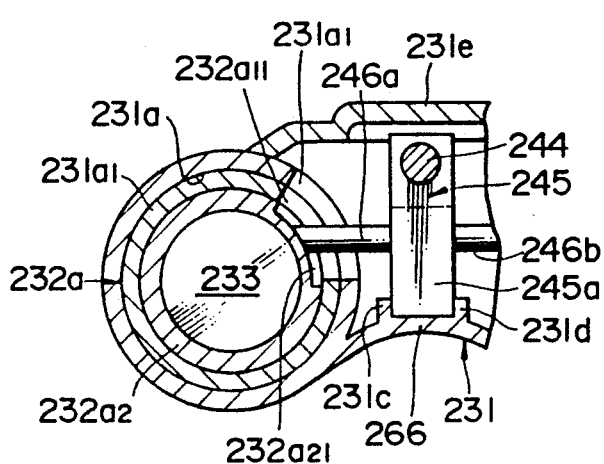
FIG. 16 is a fragmentary cross-sectional view of one of a pair of objective lens-barrels shown in FIGS. 13 through 15.

As shown in FIG. 16, the movable block member 245 is provided with a projection 245$a$ projecting from the end of the movable block member 245 adjacent the operating roller 234, in relation perpendicular to the axis of the threaded shaft 244. The projection 245$a$ has a forward end thereof which is fitted in between a pair of guide projections 231$c$ and 241$d$ formed on the intermediate wall structure 266 on the binocular body 231 in such a manner that the projection 245$a$ is movable along the projections 231$c$ and 231$d$ while being guided thereby.

The above-mentioned opening 232$a_{11}$ is rectangular in shape and is so determined in size as to permit the interlocking arm 246$a$ to be moved reciprocatively along the axis of the threaded shaft 244, i.e., along the optical axis 1 of the objective lens system 233, and as to permit the objective lens-barrel 232$a$ to be moved angularly about the optical axis 1 of the objective lens system 233. The opening 231$a_1$ is formed in a manner similar to the opening 232$a_{11}$.

Although only the left-hand lens-barrel unit 232 has been described, the right-hand lens-barrel unit 247 is similar in construction to the left-hand lens-barrel unit 232. That is to say, the right-hand lens-barrel unit 247 is composed of an objective lens-barrel 247$a$, an eyepiece lens-barrel 247$b$ and an image-erecting chamber section 248. The detailed description of the right-hand lens-barrel unit 247 will be omitted to avoid repetition.

The binocular illustrated in FIGS. 13 through 18 comprises an interlocking mechanism arranged between the pair of image-erecting chamber sections 236 and 248 for interlocking them with each other in such a manner that the pair of eyepiece lens-barrels 232$b$ and 247$b$ are movable angularly in their respective directions opposite to each other respectively about the optical axes 1 and 1' of the objective lens systems 233 and 271 incorporated respectively in the objective lens-barrels 232$a$ and 247$a$.

Figure 14:
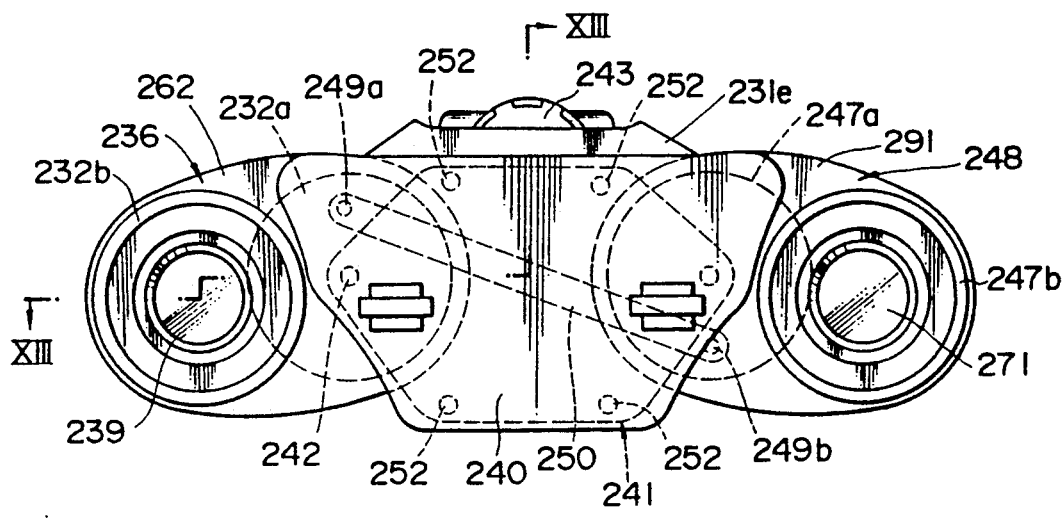
FIG. 14 is a rear elevational view of the binocular illustrated in FIG. 13.
Figure 18:
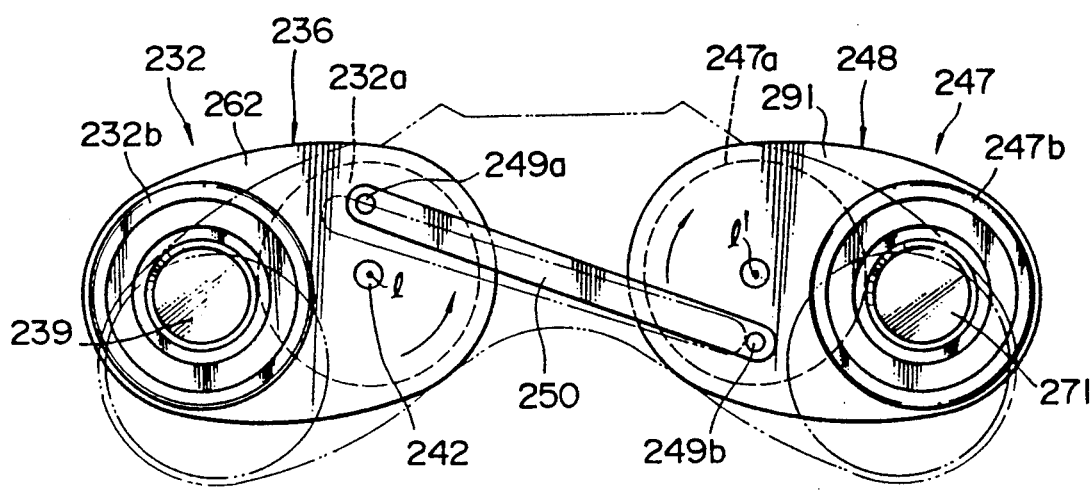
FIG. 18 is a schematic view of an interlocking mechanism incorporated in the binocular illustrated in FIGS. 13 through 17.

As shown in FIGS. 14 and 18, the interlocking mechanism is composed of an elongated link 250 having a longitudinal axis which extends at an angle with respect to a line connecting the optical axes 1 and 1' of the respective objective lens systems 233 and 271. The elongated link 250 has one end thereof which is pivotally connected to the face of the end wall 262 of the image-erecting chamber section 236 by means of a pivot 249$a$. The other end of the elongated link 250 is likewise connected pivotally to the face of the end wall 291 of the image-erecting chamber section 248 by means of a pivot 249$b$. a rear cover 240 is mounted to the end face of the intermediate wall structure 266 of the binocular body 231 to cover the elongated link 250.

In the binocular illustrated in FIGS. 13 through 18, when it is desired to adjust the distance between the eyepiece lens-barrels 232$b$ and 247$b$ to match the distance between the observer'eyes, one of the pair of lens-barrel units 232 and 247, for example, the lens-barrel unit 232 is angularly moved relatively to the binocular body 231 about the optical axis 1 of the objective lens system 233 and the extension line of the optical axis 1 passing through the ball 242. The angular movement of the lens-barrel unit 232 is transmitted to the other lens-barrel unit 247 by the longitudinal link 250, thereby angularly moving the lens-barrel unit 247 about the optical axis 1' of the optical lens system 271 in the direction opposite to the angular movement direction of the lens-barrel unit 232, as indicated by the double-dotted lines in FIG. 18. In this manner, the intereyepiece distance can be adjusted to match the distance between the observer's eyes. During the adjustment of the intereyepiece distance, the opening 232$a_{11}$ in the outer tubular member 232$a_1$ serves as a relief opening, and the arcuate groove 232$a_{21}$ in the inner tubular member 232$a_2$ serves as a relief groove. Accordingly, no force is exerted upon the interlocking arm 246$a$. The same is applicable to the right-hand lens-barrel unit 247.

When it is desired to adjust the focus of the binocular, the operating roller 243 is angularly moved about the axis of the threaded shaft 244. Specifically, angular movement of the operating roller 243 causes the threaded shaft 244 to be moved along its axis to move the interlocking arms 246$a$ and 246$b$ together with the threaded shaft 244. During angular movement of the operating roller 243, the threaded shaft 244 is prevented from being angularly moved about its axis by the movable block member 245 which is fitted in the recess defined between the pair of guide projections 231$c$ and 231$d$. Further, since the interlocking arm 246$a$ is moved within the range of the openings 231$a_1$ and 232$a_{11}$, no force is exerted upon the outer tubular member 232$a_1$ of the objective lens-barrel 232$a$.

The movement of the interlocking arm 246a along the axis of the threaded shaft 244 causes the inner tubular member $232a_2$ to be moved relatively to the outer tubular member $232a_1$ along the optical axis 1 of the objective lens systems 233, thereby adjusting the focus of the left-hand lens-barrel 232. Likewise, the inner tubular member of the objective lens-barrel 247a of the right-hand lens-barrel unit 247 is moved along the optical axis 1' of the objective lens system 271 relatively to the outer tubular member of the objective lens-barrel 247a. Thus, the focus of the right-hand lens-barrel unit 247 is adjusted.

Figure 19:
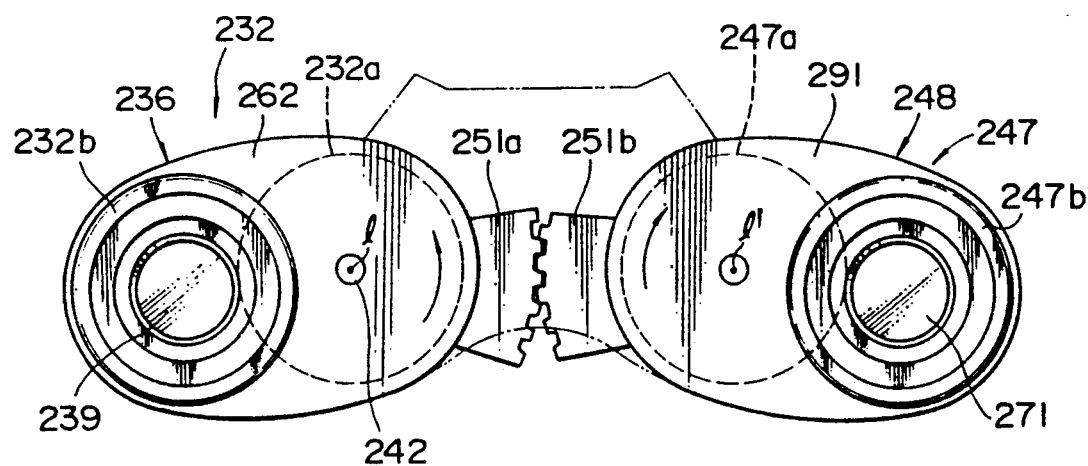
FIG. 19 is a view similar to FIG. 18, but showing a variation of the interlocking mechanism.
Figure 20:
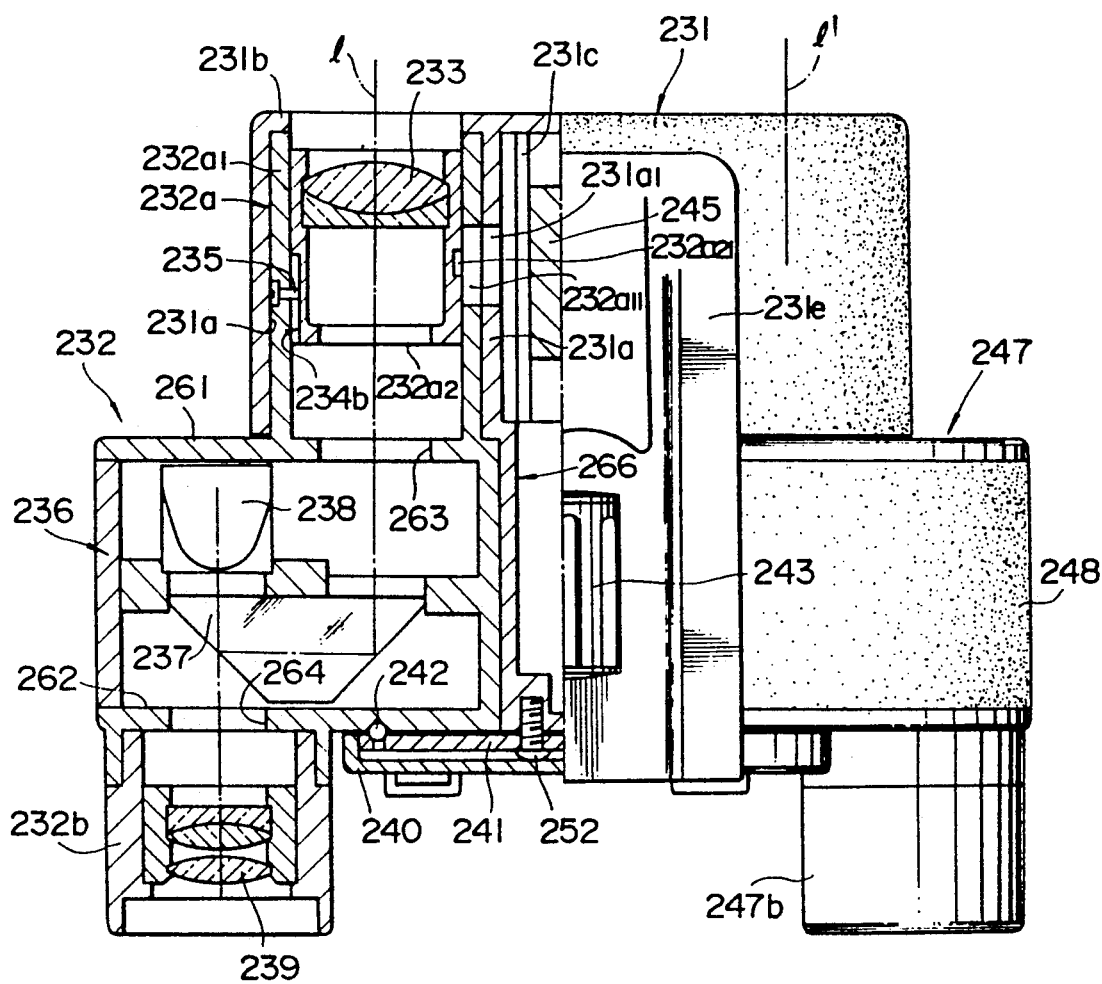
FIG. 20 is a partially cross-sectioned top plan view of a binocular according to still another modification of the invention, FIG. 20 being a cross-sectional view taken along the line XX—XX in FIG. 21.
Figure 21:
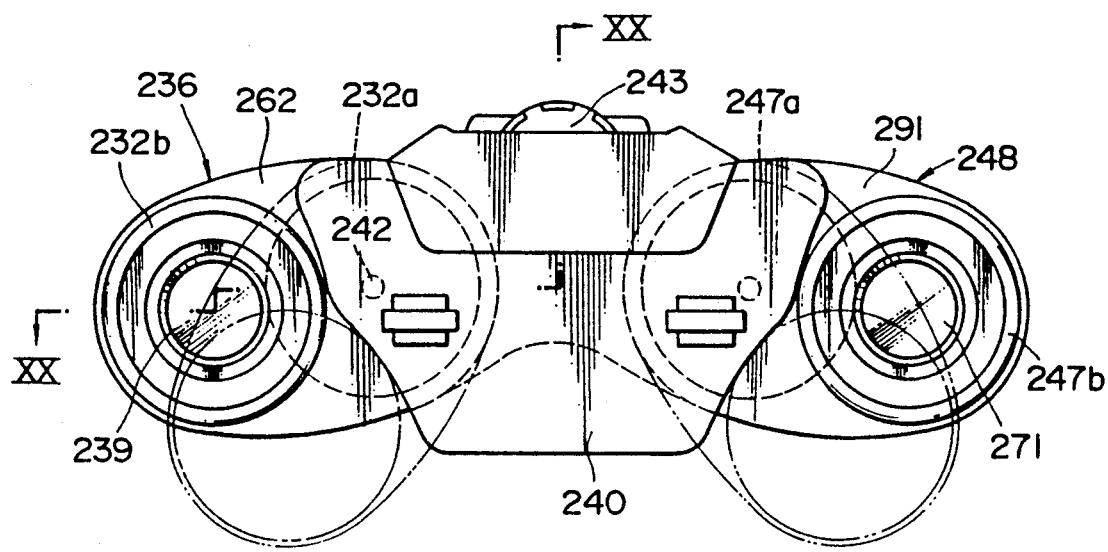
FIG. 21 is a rear elevational view of the binocular as viewed from the side of a pair of eyepiece lens-barrels illustrated in FIG. 20.
Figure 22:
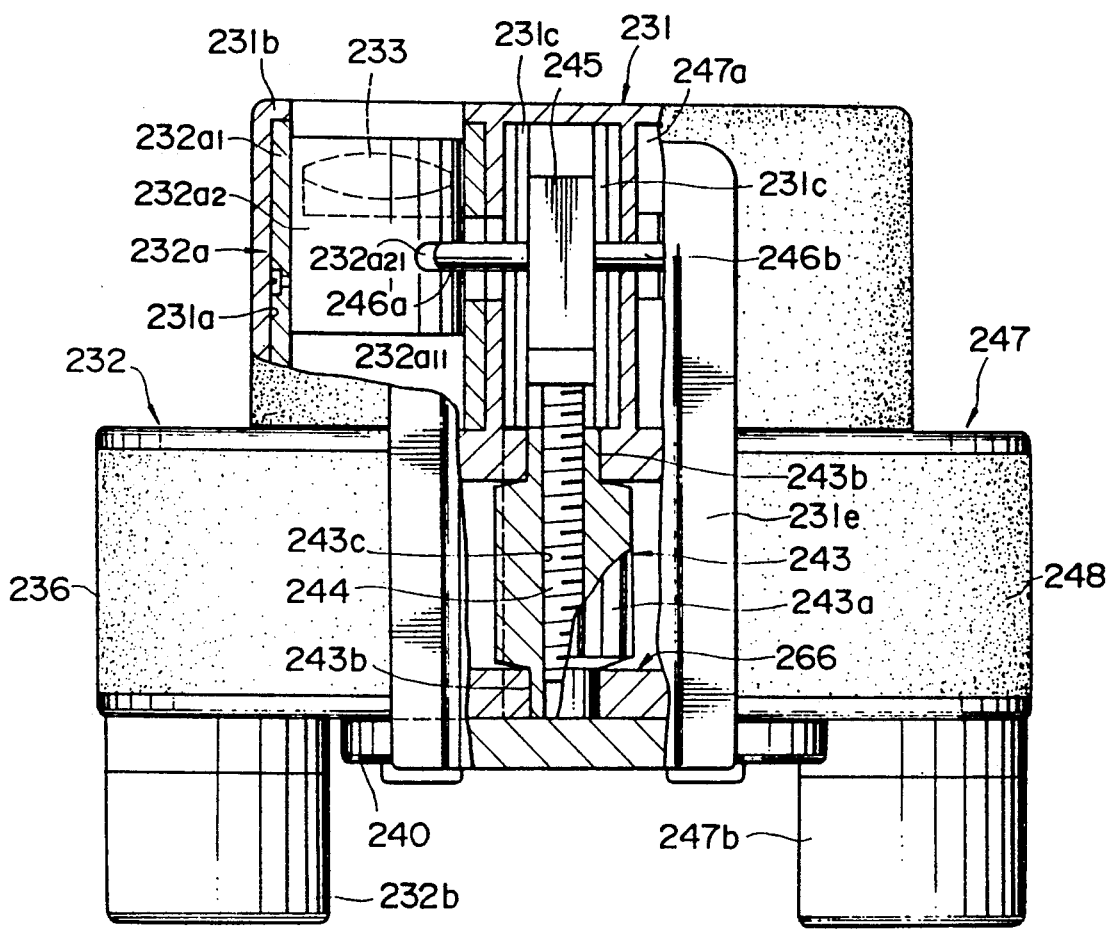
FIG. 22 is a partially broken-away top plan view of the binocular illustrated in FIG. 20, showing a focusing mechanism.
Figure 23:
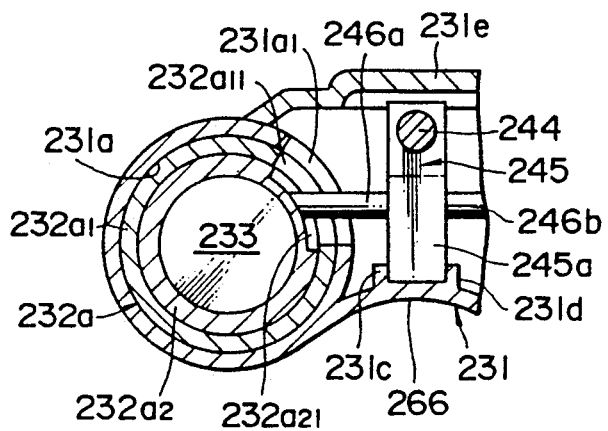
FIG. 23 is a fragmentary cross-sectional view of one of a pair of objective lens-barrels shown in FIG. 20 through 22.

FIG. 19 shows a modified form of the interlocking mechanism incorporated in the binocular illustrated in FIGS. 13 through 18. The interlocking mechanism shown in FIG. 19 is composed of a pair of toothed plates 251a and 251b which are fixedly mounted respectively to the outer peripheries of the respective image-erecting chamber sections 236 and 248. The toothed plates 251a and 251b are mounted respectively to the image-erecting chamber sections 236 and 248 at respective locations adjacent the end walls 261 and 291 of the respective image-erecting chamber sections 236 and 248, such that the toothed plates 251a and 251b are covered by the rear cover 240. The pair of toothed plates 251a and 251b are in mesh with each other so that the pair of eyepiece lens-barrels 232b and 247b are interlocked with each other.

When the binocular illustrated in FIGS. 13 through 18 or FIG. 19 is assembled, the left- and right-hand lens-barrel units 232 and 247 are first mounted to the binocular body 231. Subsequently, the focusing mechanism composed of the operating roller 243, the movable block member 245 and the like is assembled into the binocular body 231 from above. Thereafter, a body cover member 231e is mounted to the upper surface of the body 231 so as to cover the focusing mechanism, with the operating roller 243 exposed partially.

As described above, the arrangement of the binocular illustrated in FIGS. 13 through 18 or FIG. 19 is such that the pair of eyepiece lens-barrels 232b and 247b are angularly moved, in interlocked relation to each other, relative to the binocular body 231 respectively about the optical axes 1 and 1' of the respective objective lens systems 233 and 271 incorporated in the objective lens-barrels 232a and 247a, in order to adjust the intereyepiece distance to match the distance between the observer's eyes. With such arrangement, the intereyepiece-distance adjusting mechanism and the focusing mechanism can be separated from each other, making it possible to simplify the construction of each of them. Further, the number of component parts of intereyepiece-distance adjusting mechanism and the focusing mechanism can be reduced thereby facilitating assembly of the binocular. Moreover, the interlocked relationship between the pair of lens-barrel units 232 and 247 enhances the ease of adjustment of the intereyepiece distance, and also improves the outer configuration and appearance of the binocular in use.

FIGS. 20 through 24 show a modified form of the binocular illustrated in FIGS. 13 through 18. In FIGS. 20 through 24, components and parts like or similar to those illustrated in FIGS. 13 through 18 are designated by the same or like reference numerals, and the description of such like or similar components and parts will therefore be omitted to avoid repetition.

The binocular illustrated in FIGS. 20 through 24 is different from the binocular shown in FIGS. 13 through 18 in that the interlocking mechanism is not arranged between the pair of lens-barrel units 232 and 247, but the pair of the lens-barrel units 232 and 247 are angularly movable independently of each other about the respective optical axes 1 and 1' of the optical lens systems 233 and 271. Thus, it is possible for the binocular shown in FIGS. 20 through 24 to simplify the construction and to reduce the manufacturing cost.

Figure 24:
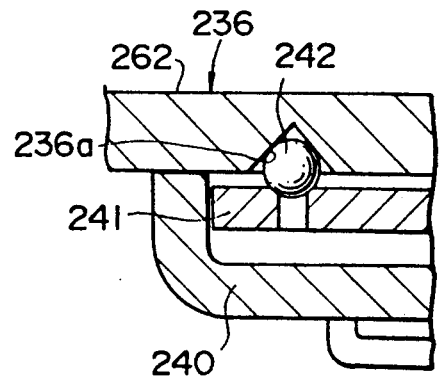
FIG. 24 is an enlarged fragmentary cross-sectional view showing a support plate and one of a pair of bearing elements incorporated in the binocular illustrated in FIG. 20.

FIGS. 25 through 29 show various modified forms of the support mechanism for the pair of lens-barrel units 232 and 247 illustrated in FIGS. 13 through 18 or FIGS. 20 through 24, and correspond to FIG. 17 or FIG. 24. It is to be understood that, although only the image-erecting chamber section 236 of the left-hand lens-barrel unit 232 is shown fragmentarily, the same is applicable to the image-erecting chamber section 248 of the right-hand lens-barrel unit 247.

Figure 25:
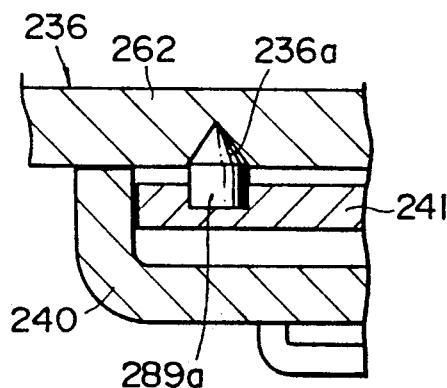
FIG. 25 is a view similar to FIG. 24, but showing a variation of the bearing element.

The support mechanism shown in FIG. 25 comprises a bearing element which is composed of a projecting pin 289a mounted to the elastic support plate 241. The projecting pin 289a has a generally pointed forward end thereof received in the conical recess 236a formed in the end plate 262 of the image-erecting chamber section 236.

Figure 26:
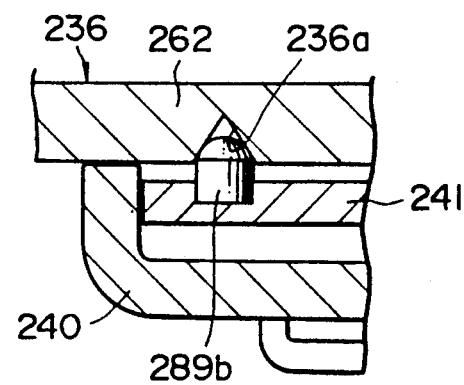
FIG. 26 is a view similar to FIG. 24, but showing another variation of the bearing element.

The support mechanism shown in FIG. 26 comprises a bearing element which is composed of a projecting pin 289b mounted to the elastic support plate 241. The projecting pin 289a has a rounded forward end thereof received in the conical recess 236a formed in the end wall 262 of the image-erecting chamber section 236.

Figure 27:
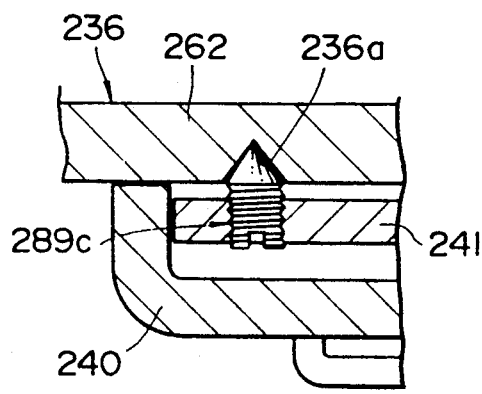
FIG. 27 is a view similar to FIG. 24, but showing still another variation of the bearing element.

The support mechanism shown in FIG. 27 comprises a bearing element which is composed of a projecting pin 289c threadedly engaged with the elastic support plate 241. The projecting pin 389c has a generally pointed forward end thereof received in the conical recess 236a formed in the end wall 262 of the image-erecting chamber section 236.

Figure 28:
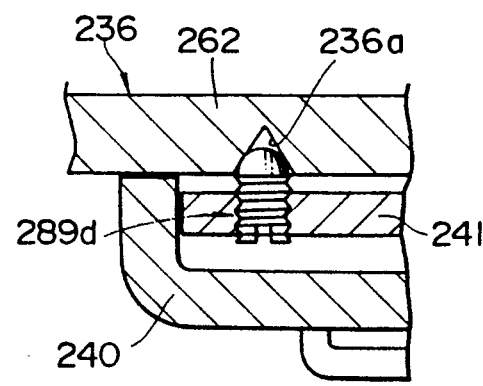
FIG. 28 is a view similar to FIG. 24, but showing another variation of the bearing element.

The support mechanism shown in FIG. 28 comprises a bearing element which is composed of a projecting pin 289d threadedly engaged with the elastic support plate 241. The projecting pin 289d has a rounded forward end thereof received in the conical recess 236a formed in the end wall 262 of the image-erecting chamber section 236.

Figure 29:
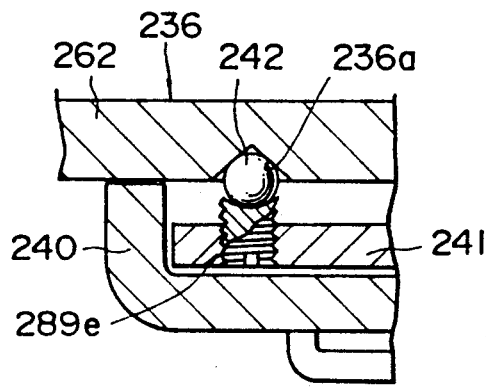
FIG. 29 is a view similar to FIG. 24, but showing still another variation of the bearing element.

The support mechanism shown in FIG. 29 comprises a bearing element which is composed of a threaded member 289e threadedly engaged with the elastic support plate 241, and the ball 242 arranged between a forward end of the threaded member 289e and the conical recess 236a formed in the end wall 262 of the image-erecting chamber section 236.

Figure 30:
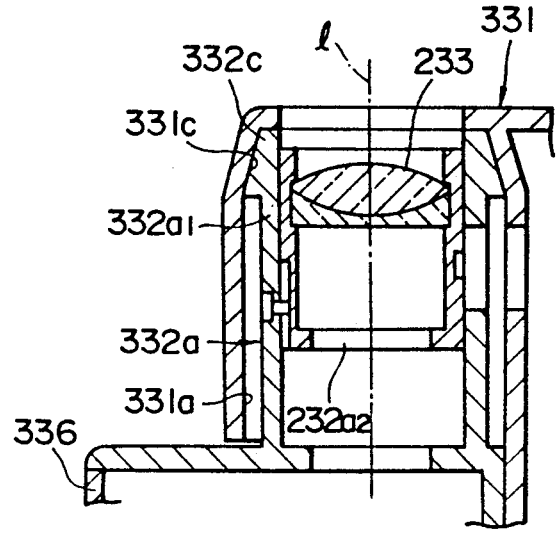
FIG. 30 is a fragmentary cross-sectional view of an improved modification of the binocular illustrated in FIGS. 20 through 24.

FIG. 30 shows a modified form of the binocular illustrated in FIGS. 13 through 18 or FIGS. 20 through 24. In the modified form shown in FIG. 30, the retaining bore 331a has an end portion 331c remote from the image-erecting chamber section 336. The end portion 331c of the retaining bore 331a is tapered so as to converge. The outer tubular member $332a_1$ of the objective lens-barrel 332a has an end portion 332c remote from the image-erecting chamber section 336. The end portion 332c of the outer tubular member $332a_1$ is tapered in complementary relation to the tapered end portion 331c of the retaining bore 331a. An elastic support plate corresponding to the elastic support plate 241 shown in FIG. 17 urges the objective lens-barrel 332a through the image-erecting chamber section 336 so that the tapered end portion 332c of the outer tubular member $332a_1$ is in sliding contact with the tapered end portion 331c of the retaining bore 331a. The right-hand lens-barrel unit, although not shown, is constructed in a similar manner.

The arrangement of the binocular shown in FIG. 30 is such that tapered end portion 332c of the outer tubular member 332a₁ of the objective lens-barrel 332a is slidably abutted against the tapered end portion 331c of the retaining bore 331a in the binocular body 331, and the image-erecting chamber section 336 is urged and supported by the support plate. With such arrangement, any mechanical play of the lens-barrel unit 332 can effectively be absorbed, and adequate frictional resistance can be applied to the angular movement of the objective lens-barrel 332a.

FIGS. 31 through 35 show a modified form of the binocular illustrated in FIGS. 13 through 18. In FIGS. 31 through 35, components and parts like or similar to those illustrated in FIGS. 13 through 18 are designated by the same or like reference numerals, and the description of such like or similar components and parts will therefore be omitted to avoid repetition.

The binocular illustrated in FIGS. 31 through 35 is different from the binocular shown in FIGS. 13 through 18 in that, in each of the pair of lens-barrel units, the objective lens-barrel is formed separately from the image-erecting chamber section.

Figure 31:
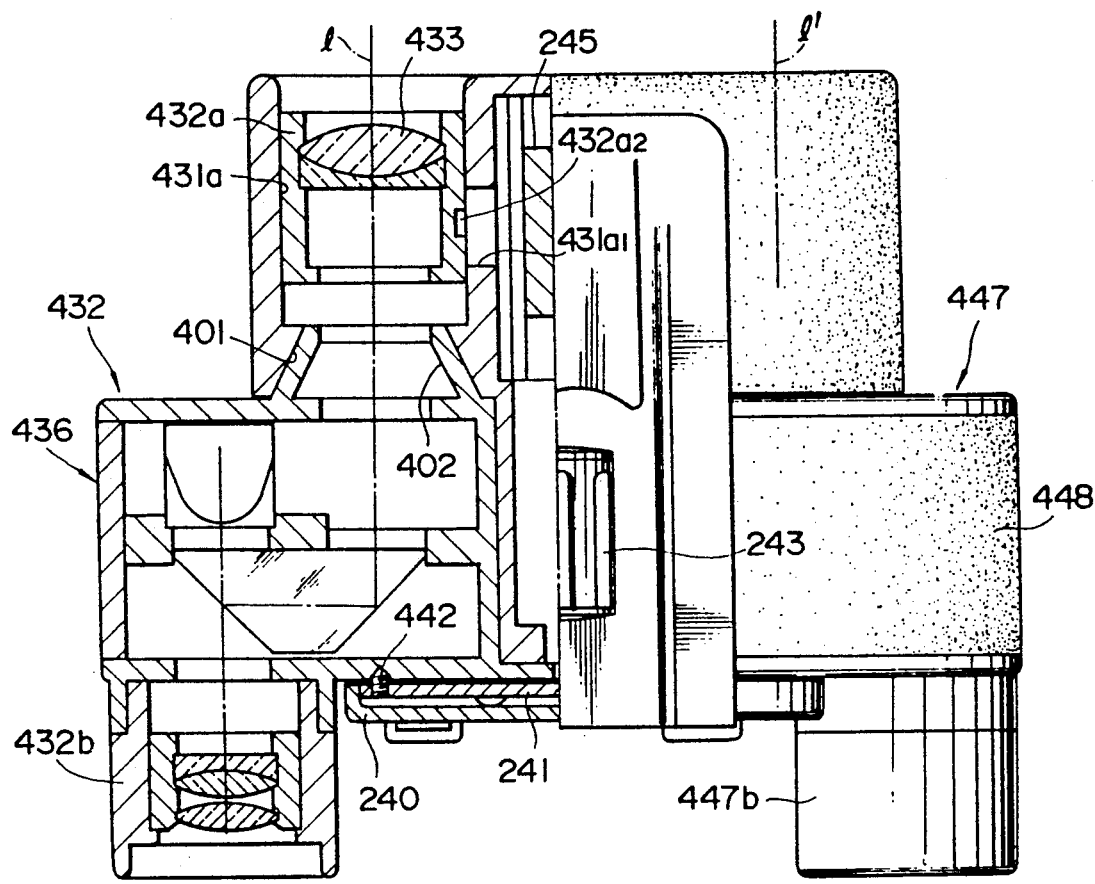
FIG. 31 is a partially cross-sectioned top plan view taken along line XXXI—XXXI of FIG. 32 of a binocular according to another modification of the invention.

Specifically, as shown in FIG. 31, the objective lens-barrel 432a is formed separately from the image-erecting chamber section 436. The objective lens-barrel 432a is accommodated in the retaining bore 431a so as to prevent angular movement relative to the binocular body 431 about the optical axis 1 of the objective lens system 433, but allowing reciprocal movement relative to the binocular body 431 along the optical axis 1 of the objective lens system 433.

The binocular body 431 is formed therein with a bore 401 so tapered as to diverge away from the objective lens-barrel 436. The tapered bore 401 in the binocular body 431 is aligned with the optical axis 1 of the objective lens system 433. The image-erecting chamber section 436 is provided with a hollow projection 402 which is aligned with the optical axis 1 of the objective lens system 433. The hollow projection 402 has an outer periphery which is tapered in complementary relation to the tapered bore 401 in the binocular body 431. The tapered hollow projection 402 is fitted in the tapered bore 401 in the binocular body 431 in such a manner that the outer periphery of the hollow projection 402 is in sliding contact with the tapered bore 401 in the binocular body 431.

Figure 35:
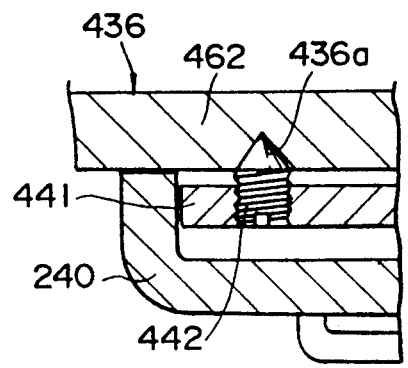
FIG. 35 is an enlarge fragmentary cross-sectional view of the binocular illustrated in FIGS. 31 through 33, showing a support plate and one of a pair of bearing elements.

As clearly shown in FIG. 35, a bearing element or a projecting pin 442 is threadedly engaged with the support plate 441 formed of elastic material. The projecting pin 442 has a generally pointed forward end thereof received in the conical recess 436a formed in the end wall 462 of the image-erecting chamber section 436. The projecting pin 442 is arranged on the extension line of the optical axis 1 of the objective lens system 433. The support plate 441 resiliently urges the image-erecting chamber section 436 toward the objective lens-barrel 432a so that the outer periphery of the hollow projection 402 is abutted against the tapered bore 401 in the binocular body 431. Turning adjustment of the projecting pin 442 enables the abutting pressure of the tapered hollow projection 402 against the tapered bore 401 to be varied, thereby making it possible to eliminate any mechanical play in angular movement of the image-erecting chamber section 436.

In the focusing mechanism of the binocular illustrated in FIGS. 31 through 35, the interlocking arm 246a extends laterally through the opening 431a₁ formed in the wall of the retaining bore 431a, and the forward end of the interlocking arm 246a is received in a recess 432a₂ formed in the outer periphery of the objective lens-barrel 432a. Angular movement of the operating roller 243 causes the threaded shaft 244 to be reciprocatively moved together with the interlocking arm 246a along the axis of the threaded shaft 244, thereby reciprocally moving the objective lens-barrel 432a relative to the binocular body 431 along the optical axis 1 of the objective lens system 433, but preventing angular movement of the objective lens-barrel 432a relative to the binocular body 431 about the optical axis 1 of the objective lens system 433.

Only the left-hand lens-barrel unit 432 of the binocular illustrated in FIGS. 31 through 35 has been described. However, the same technical concept is applied to the right-hand lens barrel unit 447. That is, the right-hand lens-barrel unit 447 is composed of an objective lens-barrel 447a, an image-erecting chamber section 448 and an eyepiece lens-barrel 447b, which correspond respectively to the objective lens-barrel 432a, the image-erecting chamber section 436 and the eyepiece lens-barrel 432b.

Figure 32:
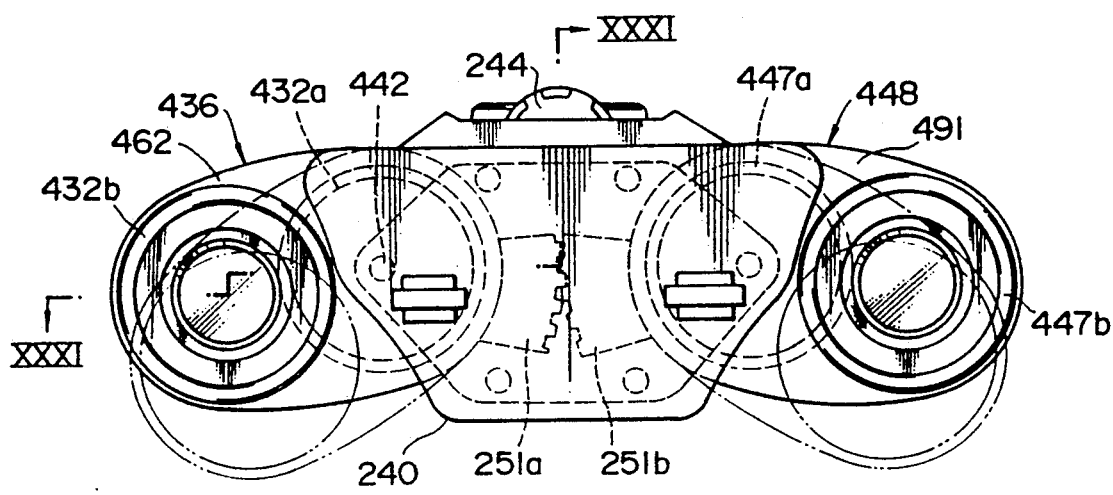
FIG. 32 is a rear elevational view of the binocular as viewed from the side of a pair of eyepiece lens-barrels illustrated in FIG. 31.
Figure 33:
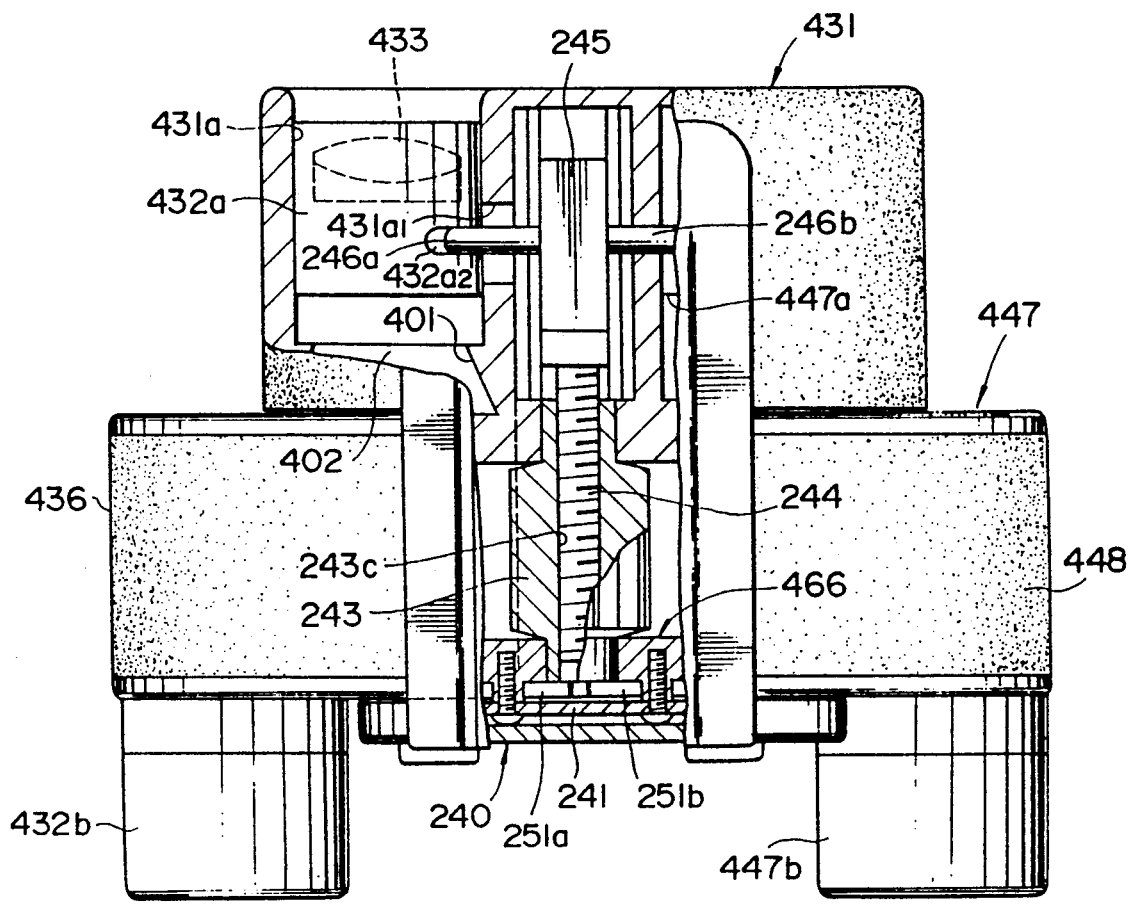
FIG. 33 is a partially broken-away top plan view of the binocular illustrated in FIG. 31, showing a focusing mechanism.
Figure 34:
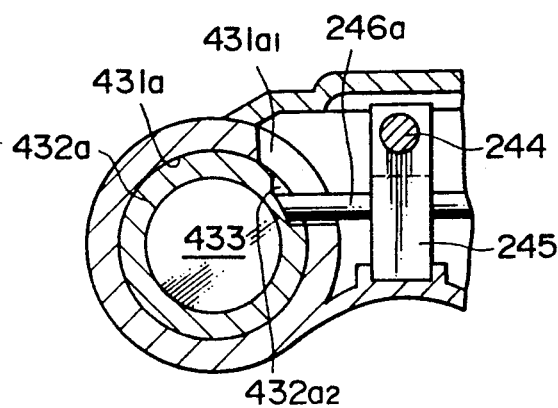
FIG. 34 is a fragmentary cross-sectional view of one of the pair of objective lens-barrels shown in FIGS. 31 through 33.

As shown in FIG. 32, the interlocking mechanism similar to that illustrated in FIG. 19 is incorporated in the binocular illustrated in FIGS. 31 through 35. That is, the pair of toothed plates 251a and 251b are fixedly mounted respectively to the outer peripheries of the respective image-erecting chamber sections 436 and 448. The toothed plates 251a and 251b are mounted respectively to the image-erecting chamber sections 436 and 448 at respective locations adjacent the end walls 462 and 491 of the respective image-erecting chamber sections 436 and 448, such that the toothed plates 251a and 251b are covered by the rear cover 240. The pair of toothed plates 251a and 251b are in mesh with each other so that the pair of eyepiece lens-barrels 432b and 447b are interlocked with each other.

Figure 36:
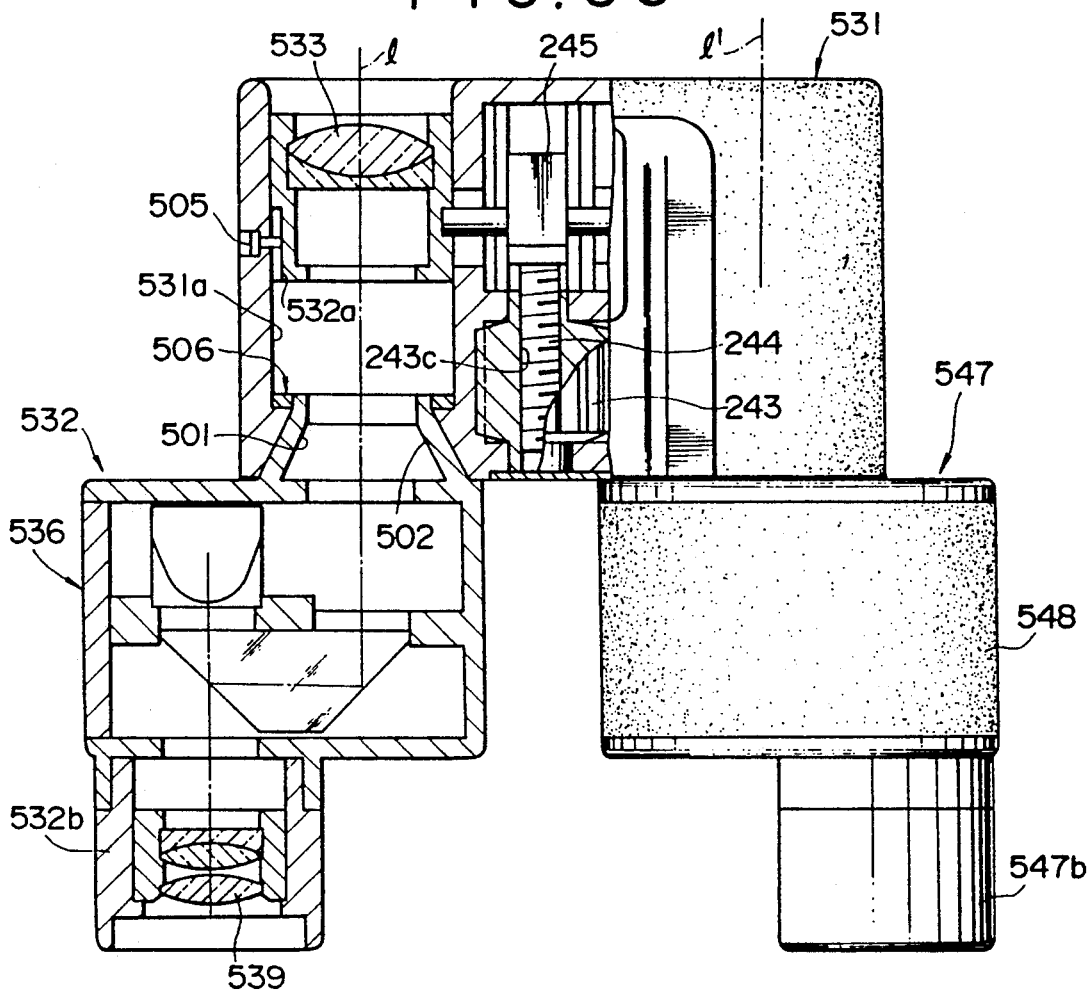
FIG. 36 is a partially cross-sectioned top plan view taken along line XXXVI—XXXVI in FIG. 37.
Figure 37:
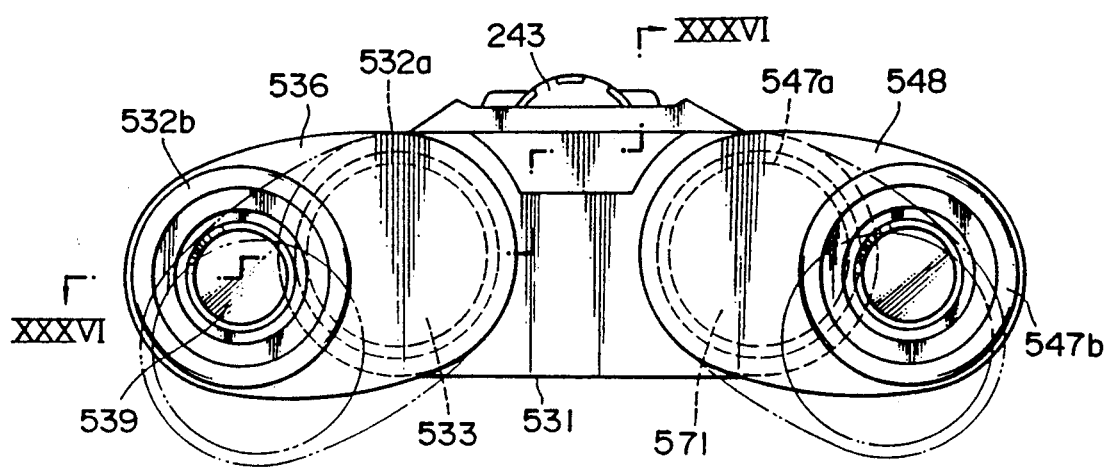
FIG. 37 is a rear elevational view of the binocular as viewed from the side of a pair of eyepiece lens-barrels illustrated in FIG. 36.
Figure 38:
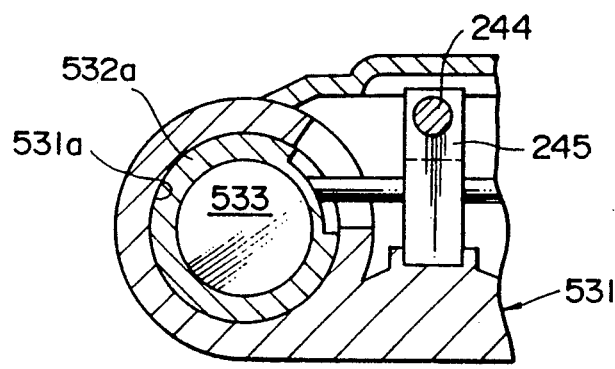
FIG. 38 is a fragmentary cross-sectional view showing one of the pair of objective lens-barrels illustrated in FIGS. 36 and 37.

FIGS. 36 through 38 shows a modified form of the binocular illustrated in FIGS. 31 through 35. In FIGS. 36 through 38, components and parts like or similar to those illustrated in FIGS. 31 through 35 are designated by the same or like reference numerals, and the description of such like or similar components and parts will therefore be omitted to avoid repetition.

The binocular illustrated in FIGS. 36 through 38 is different from the binocular shown in FIGS. 31 through 35 mainly in that the interlocking mechanism is not arranged between the pair of lens-barrel units 532 and 547, but the pair of the lens-barrel units 532 and 547 are angularly movable independently of each other about the respective optical axes 1 and 1' of the optical lens systems 533 and 571, and in that the objective lens-barrel 532 is accommodated in the retaining bore 531a so that angular movement is prevented relative to the binocular body 531 about a optical axis 1 by means of a pin 505 mounted to the wall of the retaining bore 531a in the binocular body 531.

As shown in FIG. 36, the image-erecting chamber section 536 is provided with the hollow projection 502 whose forward end projects from the tapered bore 501 in the binocular body 531 into the retaining bore 531a. A retaining ring 506 such as, for example, a screw nut is arranged within the retaining bore 531a and is threadedly engaged with an outer periphery of the forward end of the hollow projection 502, to prevent the hollow projection 502 from coming out of the tapered bore 501 in the binocular body 531.

Only the left-hand lens-barrel unit 532 of the binocular illustrated in FIGS. 36 through 38 has been described. However, the same technical concept is applied to the right-hand lens barrel unit 547. That is, the right-hand lens-barrel unit 547 is composed of an objective lens-barrel 547a, an image-erecting chamber section 548 and an eyepiece lens-barrel 547b, which correspond respectively to the objective lens-barrel 532, the image-erecting chamber section 536 and the eyepiece lens-barrel 532b.

Figure 39:
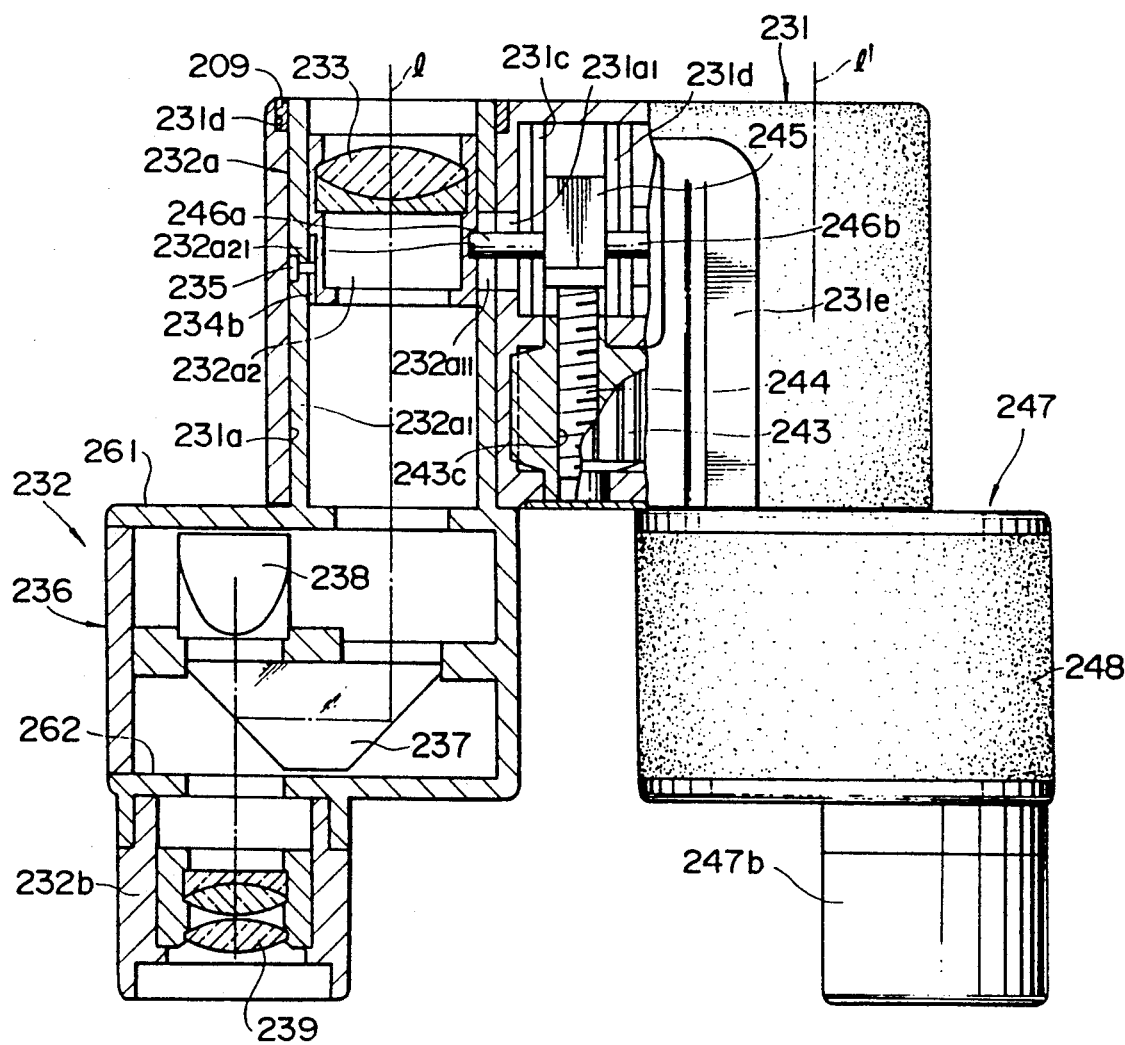
FIG. 39 is a view similar to FIG. 36, but showing another modification of the invention.

FIG. 39 shows a modified form of the binocular illustrated in FIGS. 13 through 18. In FIG. 39, components and parts like or similar to those illustrated in FIGS. 13 through 18 are designated by the same or like reference numerals, and the description of such like or similar components and parts will therefore be omitted to avoid repetition.

The binocular illustrated in FIG. 39 is different from the binocular shown in FIGS. 13 through 18 in that the binocular has no interlocking mechanism, but comprises retaining means arranged between the binocular body 231 and the outer tubular member $232a_1$ of the objective lens-barrel 232a for preventing the same from coming out of the retaining bore 231a in the binocular body 231. Specifically, an annular recess 231d is formed in the end face of the binocular body 231 remote from the image-erecting chamber section 236. The retaining means is composed of a retaining ring 209 such as, for example, a screw nut which is received in the annular recess 231d and is threadedly engaged with an outer periphery of the outer tubular member $232a_1$.

Only the left-hand lens-barrel unit of the binocular illustrated in FIG. 39 has been described. However, the same technical concept is applied to the right-hand lens barrel unit 247.

FIGS. 40 through 43 shows another modified form of the binocular illustrated in FIGS. 13 through 18. In FIGS. 40 through 43, components and parts like or similar to those illustrated in FIGS. 13 through 18 are designated by the same or like reference numerals, and the description of such like or similar components and parts will therefore be omitted to avoid repetition.

The binocular illustrated in FIGS. 40 through 43 is different from the binocular shown in FIGS. 13 through 18 in that the binocular has no interlocking mechanism, but comprises thread means arranged between the inner tubular member $632a_2$ and the outer tubular member $632a_1$ for enabling the inner tubular member $632a_2$ to be moved relatively to the outer tubular member $632a_1$ along the optical axis 1 of the objective lens system 633 when the inner tubular member $632a_2$ is moved angularly about its own axis. Specifically, helicoid threads 611 are formed in the inner periphery of the outer tubular member $632a_1$, while helicoid threads 612 are formed in the outer periphery of the inner tubular member $632a_2$. The inner and outer tubular members $632a_2$ and $632a_1$ are threadedly engaged with each other through the helicoid threads 611 and 612.

Figure 40:
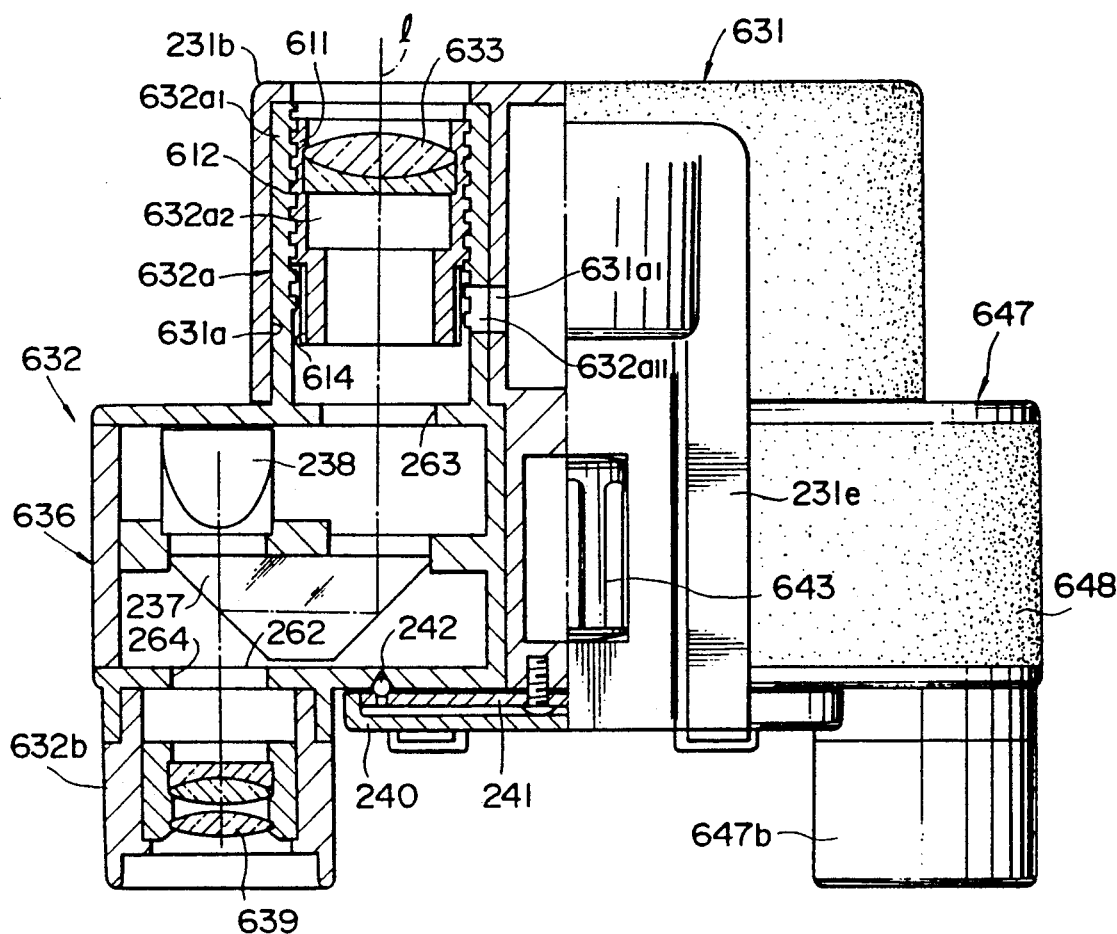
FIG. 40 is a partially cross-sectioned top plan view taken along line XL—XL in FIG. 41 of a binocular according to still another modification of the invention.
Figure 41:
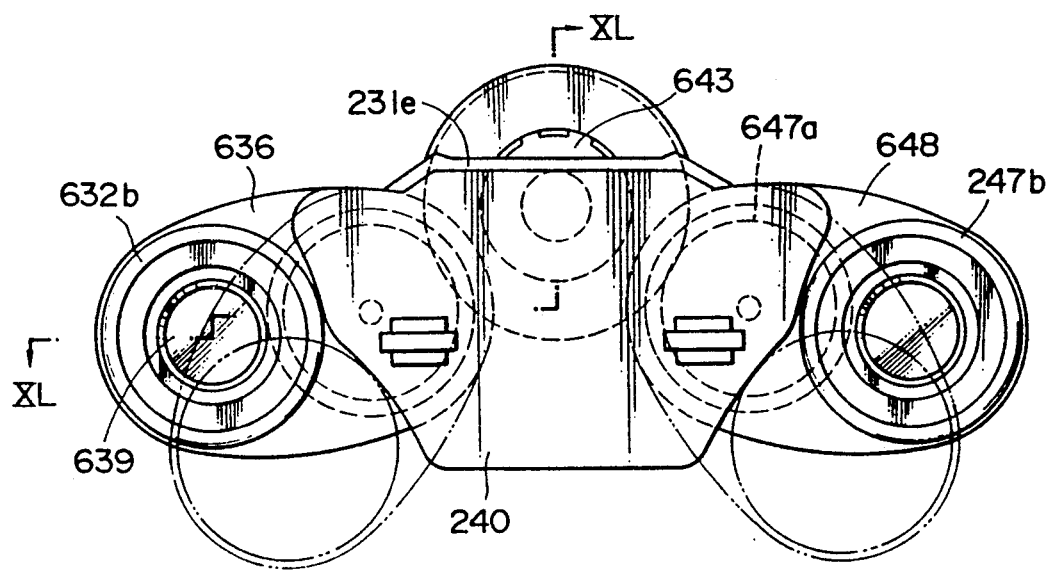
FIG. 41 is a rear elevational view of the binocular illustrated in FIG. 40.
Figure 42:
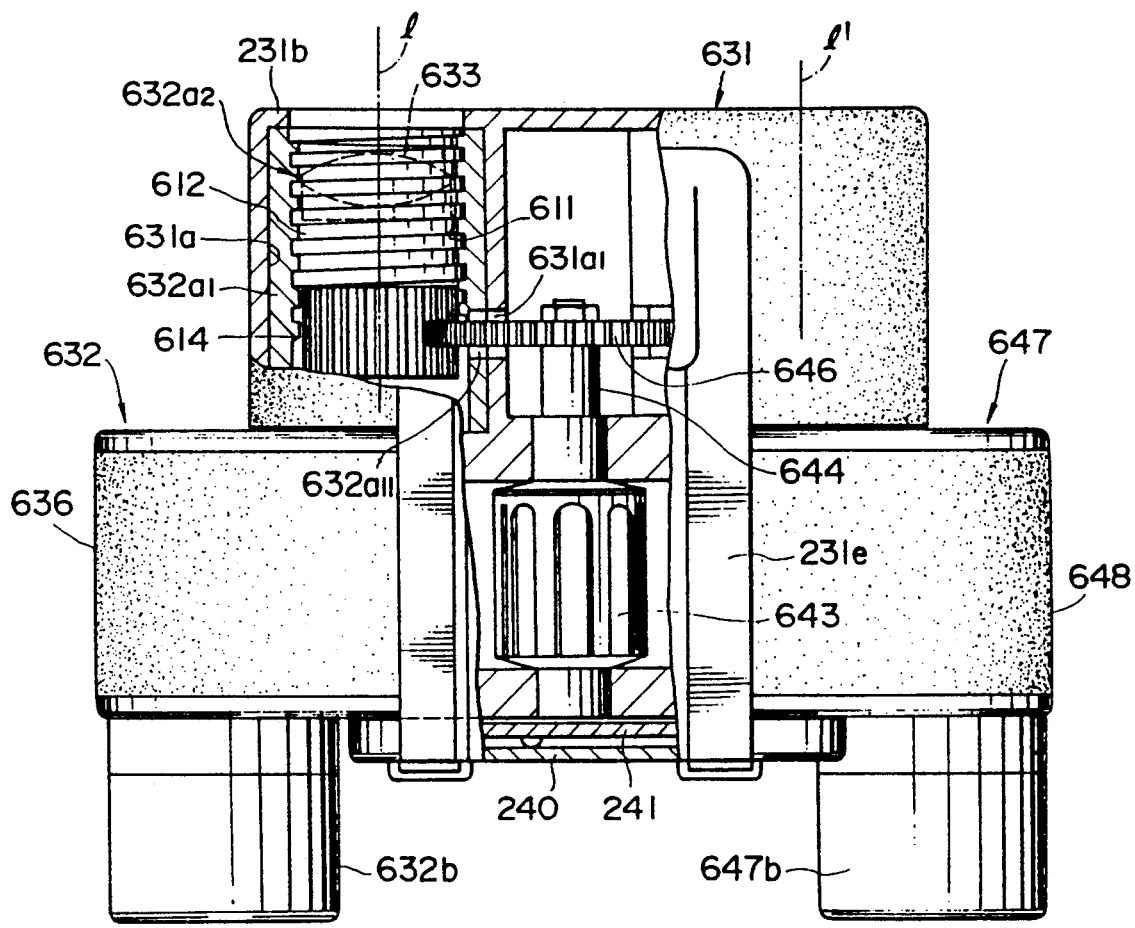
FIG. 42 is a partially broken-away top plan view of the binocular illustrated in FIGS. 40 and 41, showing a focusing mechanism.
Figure 43:
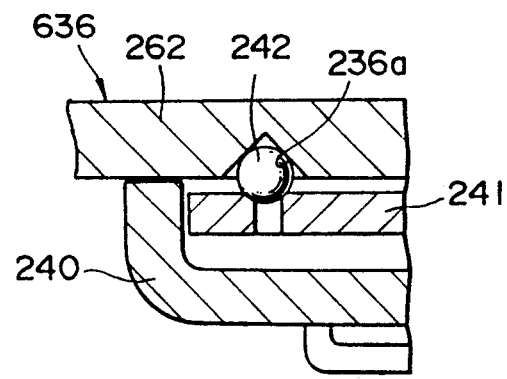
FIG. 43 is an enlarged fragmentary cross-sectional view of a support plate and one of a pair of bearing elements incorporated in the binocular illustrated in FIGS. 40 through 42.

The binocular illustrated in FIGS. 40 through 42 comprises a focusing mechanism. As best shown in FIG. 42, the focusing mechanism includes an operating roller 643 which is mounted on a shaft 644 for angular movement therewith about an axis of the shaft 644. A gear wheel 646 is mounted to the shaft 644 for angular movement therewith about the axis of the shaft 644. The gear wheel 646 has a peripheral portion whose part extends into the retaining bore 631a in the binocular body 631 through an opening $631a_1$ formed in the wall of the retaining bore 631a and an opening $632a_{11}$ formed in the outer tubular member $632a_1$. The gear wheel 646 is in mesh with gear teeth 614 formed on the outer periphery of the inner tubular member $632a_2$. The shaft 644 transmits angular movement of the operating roller 643 to the inner tubular member $632a_2$ through the gear wheel 646, thereby angularly moving the inner tubular member $632a_2$ relatively to the outer tubular member $632a_1$ about the optical axes 1 of the objective lens system 633. Because of the threaded engagement between the helicoid threads 611 and 612, the angular movement of the inner tubular member $632a_2$ relative to the outer tubular member $632a_1$ causes the inner tubular member $632a_2$ to be reciprocatively moved relatively to the outer tubular member $632a_1$ along the optical axis 1 of the objective lens system 633.

Only the left-hand lens-barrel unit 632 of the binocular illustrated in FIGS. 40 through 43 has been described. However, the same technical concept is applied to the right-hand lens barrel unit 647. That is, the right-hand lens-barrel unit 647 is composed of an objective lens-barrel 647a, an image-erecting chamber section 648 and an eyepiece lens-barrel 647b, which correspond respectively to the objective lens-barrel 632a, the image-erecting chamber section 636 and the eyepiece lens-barrel 632b. It is noted that the helicoid threads 611 and 612 in the left-hand lens-barrel 632 are opposite in direction to helical threads in the right-hand lens-barrel unit 647, because the inner tubular member of the right-hand objective lens-barrel 647a is angularly moved by the gear wheel 646 in the direction opposite to that of the inner tubular member $632a_2$ of the left-hand objective lens-barrel 632a.

Figure 44:
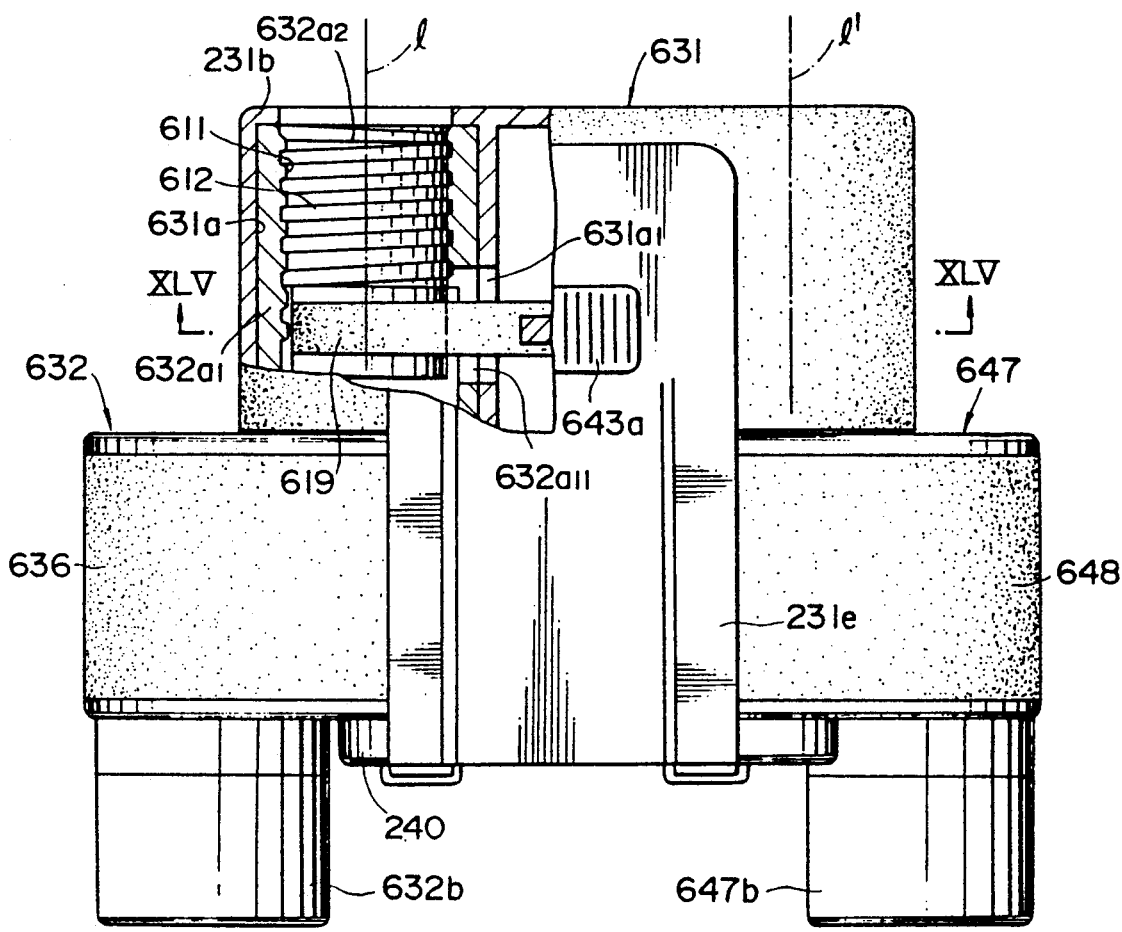
FIG. 44 is a view similar to FIG. 42, but showing a variation of the focusing mechanism.
Figure 45:
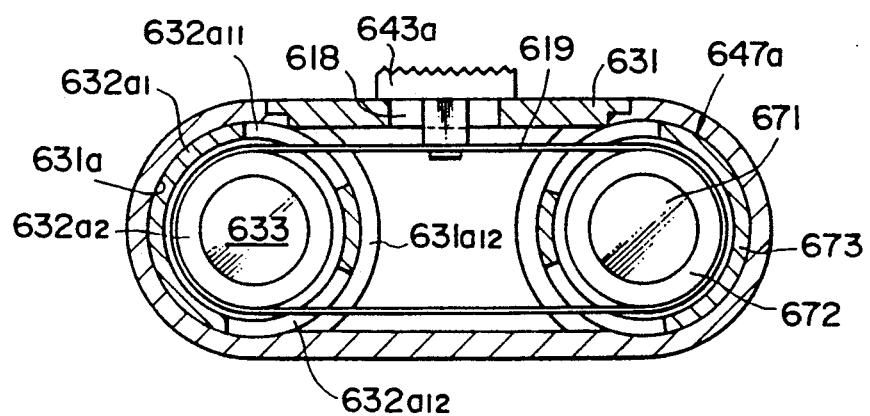
FIG. 45 is a cross-sectional view taken along the line XLV—XLV in FIG. 44.

FIGS. 44 and 45 show a modified form of the binocular illustrated in FIGS. 40 through 43. In FIGS. 44 and 45, components and parts like or similar to those illustrated in FIGS. 40 through 43 are designated by the same or like reference numerals, and the description of such like or similar components and parts will therefore be omitted to avoid repetition.

The binocular illustrated in FIGS. 44 and 45 is different from the binocular shown in FIGS. 40 through 43 in the arrangement of the focusing mechanism. That is, an operating knob 643a is mounted to the binocular body 631 for reciprocal linear movement relative thereto along a guide bore 618 in the wall of the binocular body 631 in a direction perpendicular to the optical axis 1 of the objective lens system. An endless belt 619 extends between and runs around the inner tubular member $632a_2$ of the left-hand objective lens-barrel 632a and the inner tubular member 672 of the right-hand objective lens-barrel 647a. Specifically, the endless belt 619 runs around the outer periphery of an end portion of the inner tubular member $632a_2$ adjacent the image-erecting chamber section 636. The endless belt 619 transmits reciprocal linear movement of the operating knob 643a to the inner tubular member $632a_2$ to angularly move the inner tubular member 672 about its axis relative to the outer tubular member 673.

In the binocular illustrated in FIGS. 44 and 45, the opening $631a_{12}$ in the wall of the retaining bore 631a, the pair of openings $632a_{11}$ and $632a_{12}$ in the outer tubular member $632a_1$ and the guide bore 618 in the wall of the binocular body 631 are formed with slight room, because the endless belt 619 is also moved with movement of the inner tubular member $632a_2$.

Only the left-hand lens-barrel unit 632 of the binocular illustrated in FIGS. 44 and 45 has been described. However, the same technical concept is applied to the right-hand lens barrel unit 637. That is, the right-hand lens-barrel unit 647 is composed of the objective lens-barrel 647a, an image-erecting chamber section 648 and an eyepiece lens-barrel 647b, which correspond respectively to the objective lens-barrel 632a, the image-erecting chamber section 636 and the eyepiece lens-barrel 632b.

Figure 46:
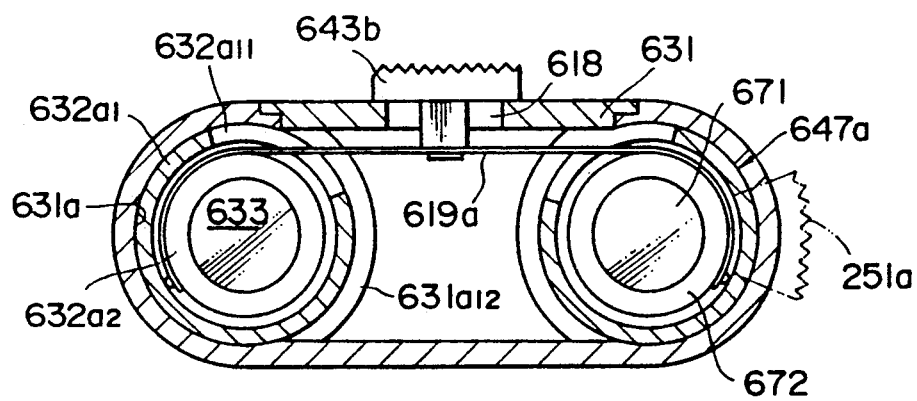
FIG. 46 is a view similar to FIG. 45, but showing another variation of the focusing mechanism.

FIG. 46 shows a modified form of the focusing mechanism illustrated in FIGS. 44 and 45. The focusing mechanism shown in FIG. 46 is different from that shown in FIGS. 44 and 45 only in that a belt 619a having two free ends is employed in place of the endless belt 619. Specifically, the belt 619a has opposite ends which are fixedly connected respectively to the outer periphery of the left-hand inner tubular member $632a_2$ and to the outer periphery of the right-hand inner tubular member 671.

Figure 47:
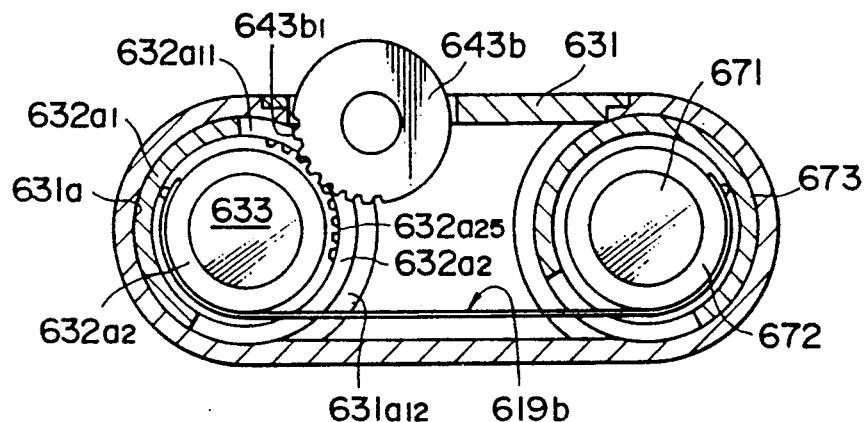
FIG. 47 is a view similar to FIG. 45, but showing still another variation of the focusing mechanism.

FIG. 47 shows another modified form of the focusing mechanism illustrated in FIGS. 44 and 45. The focusing mechanism shown in FIG. 47 includes an operating roller 643b mounted to the binocular body 631 for angular movement relative thereto about an axis of the operating roller 643b. Gear teeth $643b_1$ are formed on an outer periphery of the operating roller 643b. Likewise, gear teeth $632a_{25}$ are formed on the outer periphery of the inner tubular member of either one of the left- and right-hand objective lens-barrels 632a and 647a, that is, on the outer periphery of the inner tubular member $632a_2$ of the left-hand objective lens-barrel 632a in the illustrated modification. The gear teeth $632a_{25}$ on the inner tubular member $632a_2$ are in mesh with the gear teeth $643b_1$ on the operating roller 643b. A belt 619b having both ends free is associated with the pair of inner tubular members $632a_2$ and 672 and has opposite ends which are fixedly connected respectively to the outer peripheries of the respective inner tubular members $632a_2$ and 672. Meshing engagement between the gear teeth $643b_1$ on the operating roller 643b and the gear teeth $632a_{25}$ on the inner tubular member $632a_2$ transmits the angular movement of the operating roller 632b to the inner tubular member $632a_2$ to angularly move the inner tubular member $632a_2$ about its axis relatively to the outer tubular member $632a_1$. Moreover, the belt 619b transmits the angular movement of the left-hand inner tubular member $632a_2$ to the right-hand inner tubular member 672 thereby angularly moving the right-hand inner tubular member 672 about its axis relative to the outer tubular member 673. In this manner, the focus is adjusted.

Figure 48:
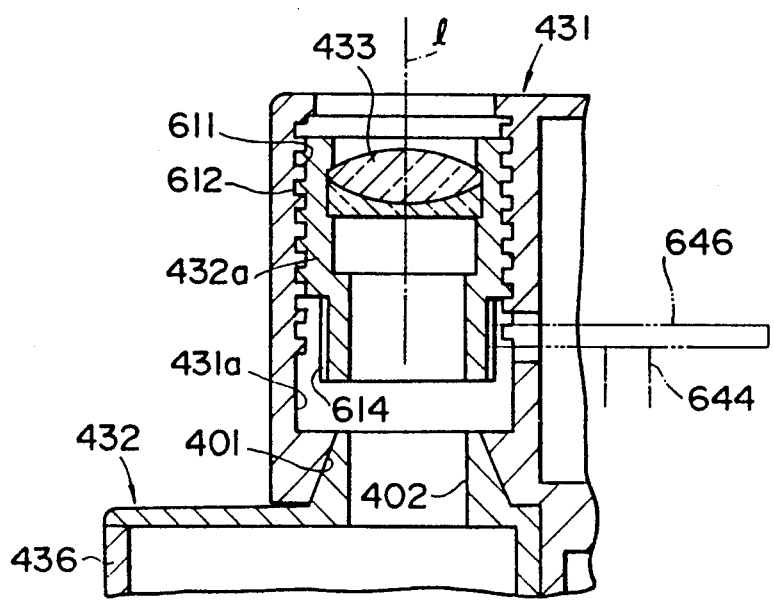
FIG. 48 is a fragmentary cross-sectional view of an improved modification of the binocular illustrated in FIGS. 40 through 45.

FIG. 48 shows a modified form of the binocular in which the technical concept described with reference to FIGS. 40 through 44 is applied to the binocular shown in FIGS. 31 through 35. That is, the objective lens-barrel 432a is formed separately from the image-erecting chamber section 436. Helicoid threads 611 are formed in the wall surface of the retaining bore 421a in the binocular body 432, while helicoid threads 612 are formed in the outer periphery of the objective lens-barrel 432. The objective lens-barrel 432 and the wall surface of the retaining bore 431a are threadedly engaged with each other through the helicoid threads 611 and 612. The binocular body 431 is formed therein with a bore 401 so tapered as to diverge away from the objective lens-barrel 432a. The tapered bore 401 in the binocular body 431 is aligned with the optical axis 1 of the objective lens system 433. The image-erecting chamber section 436 is provided with a hollow projection 402 which is aligned with the optical axis 1 of the objective lens system 433. The hollow projection 402 has an outer periphery which is tapered in complementary relation to the tapered bore 401 in the binocular body 431. The tapered hollow projection 402 is fitted in the tapered bore 401 in the binocular body 431 so that the outer periphery of the hollow projection 402 is in sliding contact with the tapered bore 401 in the binocular body 431.

FIGS. 49 through 54 shows a modified form of the binocular illustrated inFIGS. 13 through 18. In FIGS. 49 through 54, components and parts like or similar to those illustrated in FIGS. 13 through 18 are designated by the same or like reference numerals, and the description of such like or similar components and parts will therefore be omitted to avoid repetition.

Figure 54:
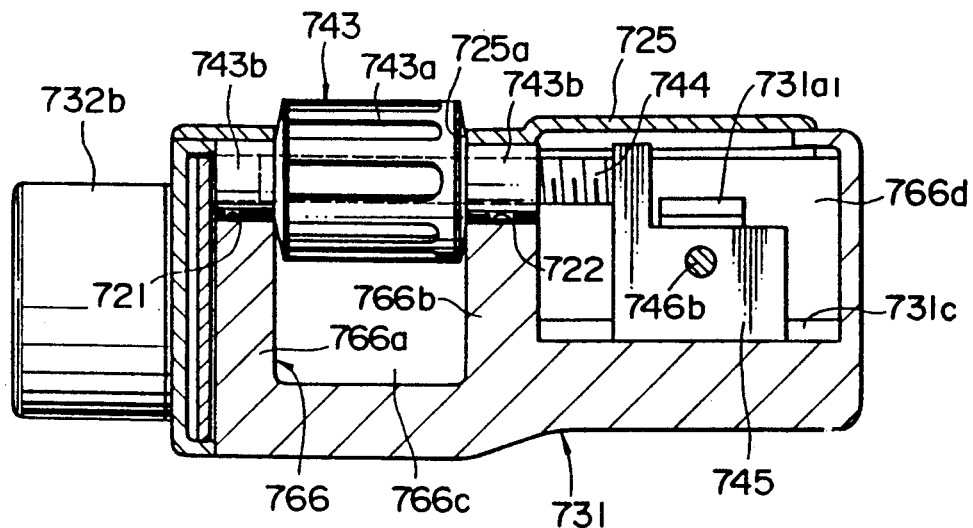
FIG. 54 is a cross-sectional view taken along a longitudinal center line of the binocular illustrated in FIGS. 49 through 53.

The binocular illustrated in FIGS. 49 through 54 is different from the binocular shown in FIGS. 13 through 18 in that no interlocking mechanis.n is provided, but an improved focusing mechanism is incorporated. Specifically, as shown in FIG. 54, the projecting portion of the intermediate wall structure 766 of the binocular body 731 is provided with a pair of spaced wall sections 766a and 766b between which an accommodating space 766c is defined. A semi-circular bearing recess 721 is formed in the top face of the wall section 766a. Likewise, a semi-circular bearing recess 722 is formed in the top face of the wall section 766b in aligned relation to the bearing recess 721. An operating roller 743 is composed of a roller body 743a and a pair of shaft sections 743b and 743b which project respectively from opposite end faces of the roller body 743a in integral relation thereto. The shaft sections 743b and 743b are aligned with each other, and are received respectively in the bearing recesses 721 and 722 such that the roller body 743a is accommodated in the accommodating space 766c and such that the operating roller 743 is angularly movable about an axis parallel to the optical axis 1 of the objective lens system 733.

Figure 51:
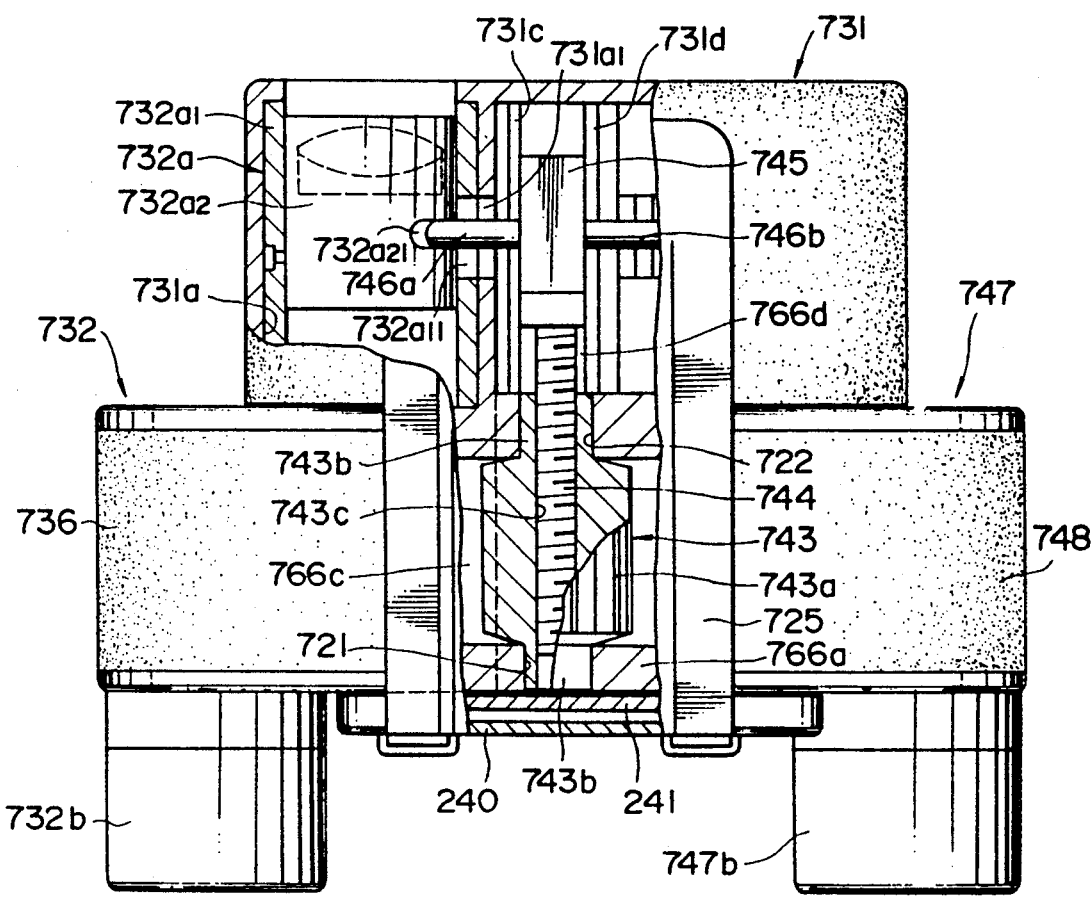
FIG. 51 is a partially broken-away to plan view of the binocular illustrated in FIGS. 49 and 50, showing a focusing mechanism.

Like the focusing mechanism described previously with reference to FIGS. 13 through 18, the operating roller 743 is formed with threads through bore 743c, and a threaded shaft 744 threadedly engaged with the threaded bore 743c in the operating roller 743. The threaded shaft 744 has an end portion remote from the operating roller 743, which extends into a second accommodating space 766d formed in the binocular body 731. A movable block member 745 is mounted to the end portion of the threaded shaft 744 so as to prevent angular movement relative to the threaded shaft 744 about the axis thereof. As shown in FIG. 51, a pair of interlocking arms 746a and 746b have respective one ends fixedly mounted to the movable block member 745. The interlocking arm 746a extends laterally through an opening $731a_1$ formed in the wall of the retaining bore 731a and through an opening $732a_{11}$ formed in the outer tubular member $732a_1$ of the objective lens-barrel 732a. The interlocking arm 746a has a forward end which is received in an arcuate groove $732a_{21}$ formed in the outer periphery of the inner tubular member $732a_2$ of the objective lens-barrel 732a.

Figure 52:
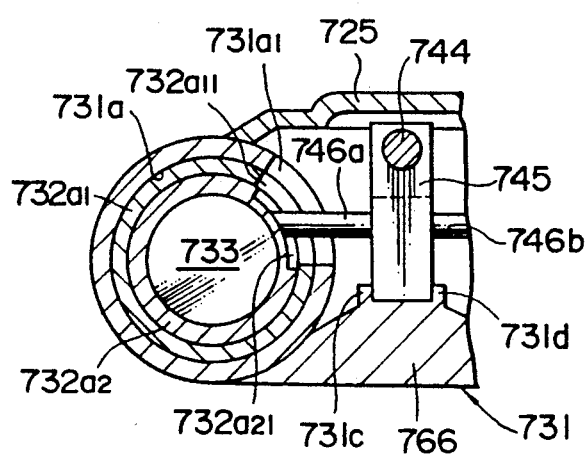
FIG. 52 is a fragmentary cross-sectional view of one of the pair of objective lens-barrels shown in FIGS. 49 through 51.
Figure 53:
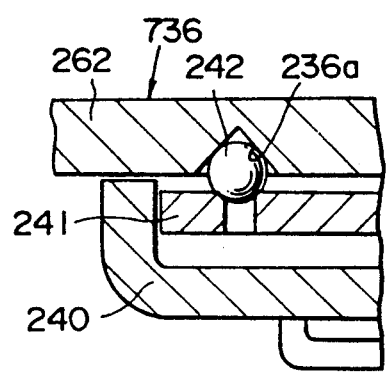
FIG. 53 is an enlarged fragmentary cross-sectional view of a support plate and one of a pair of bearing elements incorporated in the binocular illustrated in FIGS. 49 through 52.

As shown in FIGS. 52 and 54, the movable block member 745 has a lower portion thereof which is fitted in between a pair of guide projections 731c and 731d formed on the intermediate wall structure 766 of the binocular body 731 in such a manner that the block member 745 is movable along the projections 731c and 731c while being guided thereby.

The binocular illustrated in FIGS. 49 through 54 has a retaining cover member 725 which is mounted to the top face of the binocular body 731 for preventing the shaft sections 743b and 743b of the operating roller 743 from coming out of the respective bearing recesses 721 and 722. The retaining cover member 725 is formed therein with an opening 725a through which the roller body 743a of the operating roller 743 is partially exposed when the focusing mechanism is incorporated in the binocular body 731 and the retaining cover member 725 is mounted to the top face of the binocular body 731.

Incorporation of the focusing mechanism in the binocular body 731 is carried out after the left- and right-hand lens-barrel units 732 and 747 have been incorporated in the binocular body 731. That is, after both the lens-barrel units 732 and 747 have been incorporated in the binocular body 731, the focusing mechanism into which the various components are assembled is incorporated in the binocular body 731 in such a manner that the shaft sections 743b and 743b of the operating roller 743 are fitted respectively into the bearing recesses 721 and 722; the movable block member 745 is accommodated in the accommodating space 766d; the interlocking arm 746a is fitted into the arcuate groove $732a_{21}$ in the inner tubular member $732a_2$ through the opening $731a_1$ in the wall of the retaining bore 731a in the binocular body 731 and through the opening $732a_{11}$ in the outer tubular member $732a_1$; and, subsequently, the retaining cover member 725 is mounted to the top face of the binocular body 731.

The operation of the focusing mechanism incorporated in the binocular shown in FIGS. 49 through 54 is substantially the same as that described with reference to FIGS. 13 through 18, and will not be repeated here.

Figure 49:
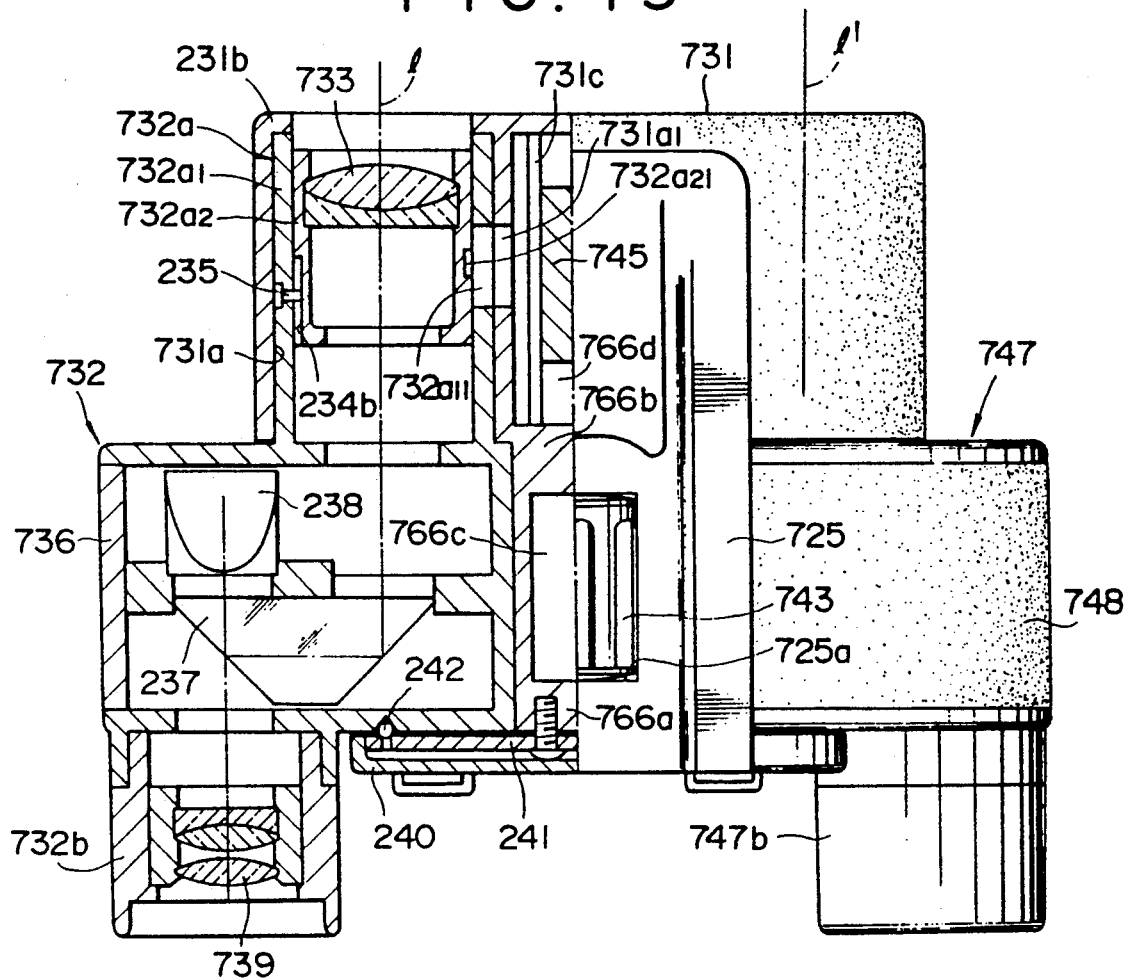
FIG. 49 is a partially cross-sectioned top plan view of a binocular according to still another modification of the invention, FIG. 49 being a cross-sectional view taken along the line XLIX—XLIX in FIG. 50.
Figure 50:
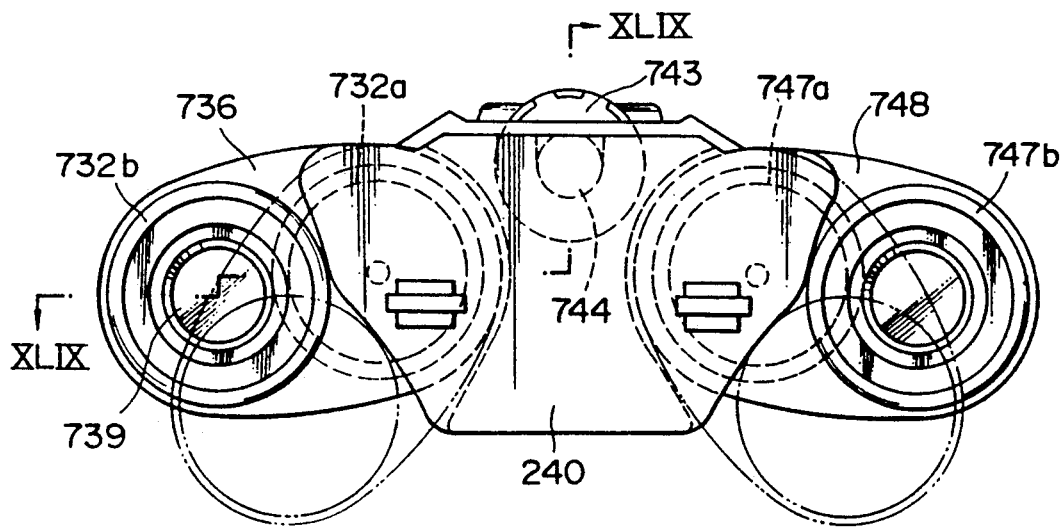
FIG. 50 is a rear elevational view of the binocular as viewed from the side of a pair of eyepiece lens-barrels illustrated in FIG. 49.

Only the left-hand lens-barrel unit 732 of the binocular illustrated in FIGS. 49 and 54 has been described. However, the same technical concept is applied to the right-hand lens barrel unit 747. That is, the right-hand lens-barrel unit 747 is composed of an objective lens-barrel 747a, an image-erecting chamber section 748 and an eyepiece lens-barrel 747b, which correspond respectively to the objective lens-barrel 732a, the image-erecting chamber section 736 and the eyepiece lens-barrel 732b.

Figure 55:
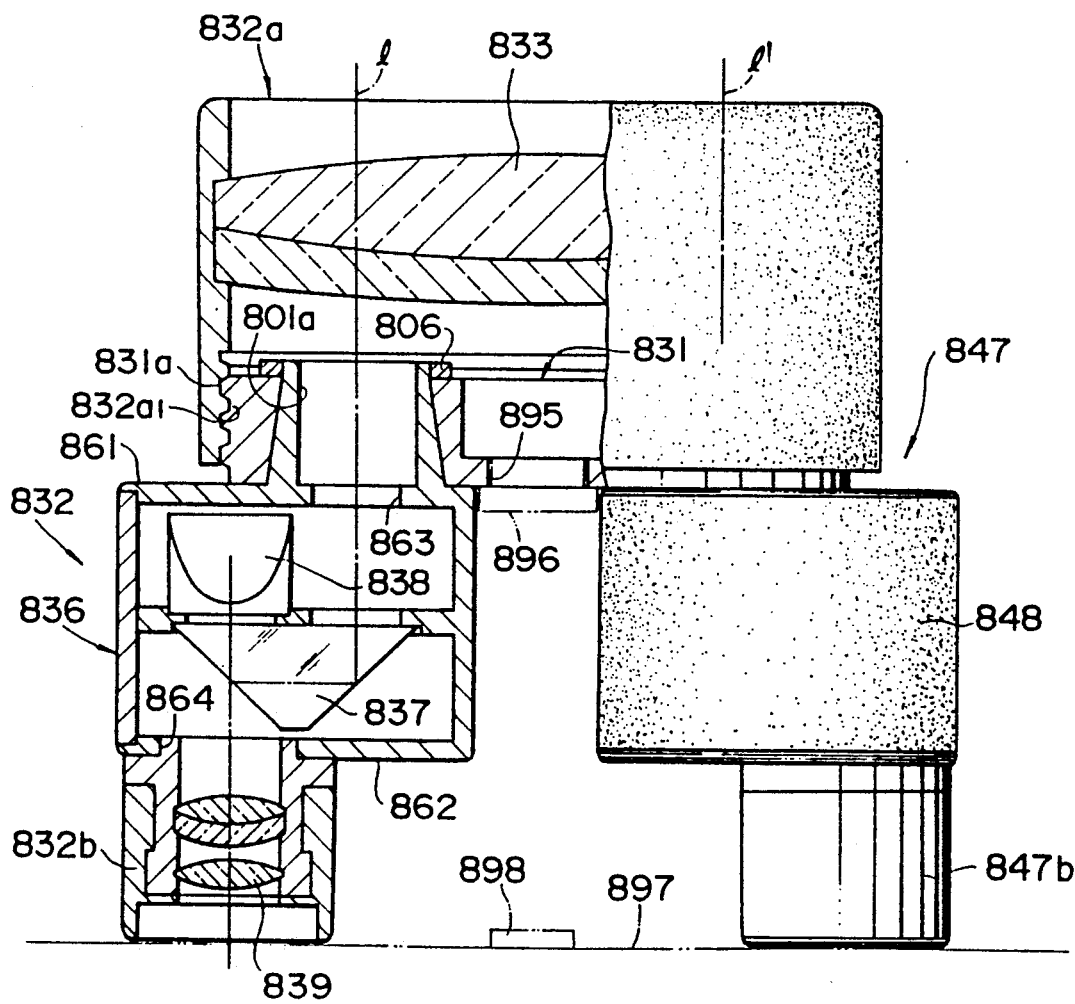
FIG. 55 is a partially cross-sectioned top plan view of a binocular according to still another modification of the invention, the binocular comprising a single objective lens-barrel common to a pair of eyepiece lens-barrels.
Figure 56:
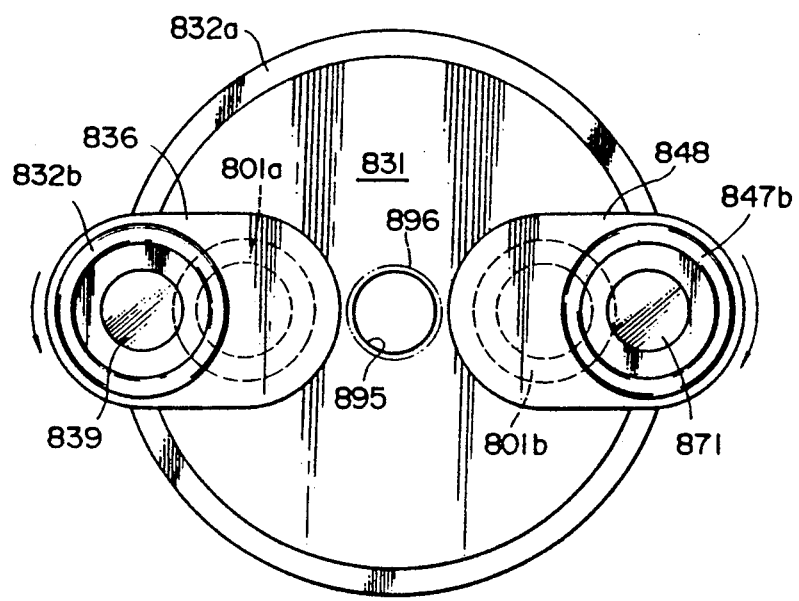
FIG. 56 is a rear elevational view of the binocular as viewed from the side of the pair of eyepiece lens-barrels illustrated in FIG. 55, showing a magnifying lens unit.

FIGS. 55 and 56 show a modified form of the binocular according to the invention, in which a single objective lens-barrel is formed separately from a pair of image-erecting chamber sections in common relation thereto.

As shown in FIGS. 55 and 56, the binocular comprises a binocular body 831 in the form of a disc, a pair of image-erecting chamber sections 836 and 848, a pair of eyepiece lens-barrels 832b and 847b, and a single objective lens-barrel 832a common to the pair of image-erecting chamber sections 836 and 848 and formed separately therefrom. The pair of image-erecting chamber sections 836 and 848 are angularly movable independently of each other relatively to the disc-shaped binocular body 831, subsequently to be described.

The disc-shaped binocular body 831 has an outer periphery which is formed with helicoid threads 831a. The objective lens-barrel 832a has an inner periphery formed with helicoid threads $832a_1$ which are threadedly engaged with the helicoid threads 831a on the disc-shaped binocular body 831. Threaded engagement between the helicoid threades 831a and $832a_1$ enables the objective lens-barrel 832a to be angularly moved relatively to the disc-shaped binocular body 831 about an axis thereof in such a manner that the objective lens-barrel 832a is reciprocatively moved relatively to the disc-shaped binocular body 83a along the axis thereof. The objective lens-barrel 832a has incorporated therein an objective lens system 833 which has a pair of optical axes l and l' passing therethrough in parallel relation to each other.

As shown in FIG. 55, the disc-shaped binocular body 831 is formed therein with a pair of bores 801a and 801b so tapered as to diverge away from the objective lens system 833. The tapered bores 801a and 801b in the binocular body 831 are aligned respectively with the optical axes l and l' of the objective lens system 833.

The image-erecting chamber section 836 has incorporated therein a pair of known prism systems 837 and 838 for erecting an image and for optically connecting the optical axis l and l' of the respective objective lens system 833 respectively to optical axes of the respective eyepiece lens systems 839 and 871 incorporated respectively in the pair of eyepiece lens barrels 832b and 847b. The image-erecting chamber section 836 has one end wall 861 which is formed therein with a bore 863 aligned with the optical axis l of the objective lens system 833. A bore 864 formed in the other end wall 862 of the image-erecting chamber section 836 is aligned with an optical axis of the eyepiece lens system 839.

The image-erecting chamber section 836 is provided with a hollow projection 802 which is aligned with the optical axis l of the objective lens system 833. The hollow projection 802 has an outer periphery which is tapered in complementary relation to the tapered bore 801a in the binocular body 831. The tapered hollow projection 802 is fitted in the tapered bore 801a in that disc-shaped binocular body 831 in such a manner that the outer periphery of the hollow projection 802 is in sliding contact with the tapered bore 801a in the disc-shaped binocular body 831.

The hollow projection 802 has a forward end projecting from an end face of the disc-shaped binocular body 831 adjacent the objective lens system 833. A retaining ring 806, such as a screw nut is arranged at the end face of the disc-shaped binocular body 831 and is threadedly engaged with an outer periphery of the forward end of the hollow projection 802, to prevent the hollow projection 802 from coming out of the tapered bore 801 in the disc-shaped binocular body 831.

Because of threaded engagement between the helicoid threads 831a and $832a_1$, angular movement of the objective lens-barrel 832a about its axis relative to the disc-shaped binocular body 831 causes the objective lens system 833 to be reciprocatively moved along the optical axes l and l' relatively to the disc-shaped binocular body 831, thereby enabling the focus to be adjusted.

In the binocular illustrated in FIGS. 55 and 56, when it is desired to adjust the distance between the eyepiece lens-barrels 832b and 847b to match the distance between the observer's eyes, the pair of image-erecting chamber sections 836 and 848 are angularly moved relatively to the disc-shaped binocular body 831 about the respective optical axes l and l' of the objective lens system 833.

As shown in FIGS. 55 and 56, the disc-shaped binocular body 831 is provided at its center with a through bore 895. The through hole 895 may be rectangular or circular in shape, or may have any other suitable shape. The through bore 895 cooperates with the objective lens system 833 to form a magnifying glass unit. As shown in FIG. 56, the through bore 895 is arranged between the pair of image-erecting chamber sections 832b and 847b. The through bore 895 is covered with a dust-proof closure 896 which is removable from the through bore 895 when it is desired to utilize the binocular as the magnifying glass unit.

When the binocular is employed as the magnifying glass unit, the dust-proof closure 896 is removed from the through bore 895. Subsequently, as indicated by the double-dotted lines in FIG. 55, the binocular is placed on a table 897 in such a manner that the pair of eyepiece lens-barrels 832b and 847b are in contact with the table 897 and in such a manner that the through bore 895 faces an object 898 to be observed. In such a set position, if the objective lens system 833 is viewed from above, the observer can view the object 898 magnified. That is to say, the binocular can be utilized as a magnifying lens unit enabling an observer to view insects, postal stamps, fossils, figures, characters or the like in a magnified scale.

Figure 57:
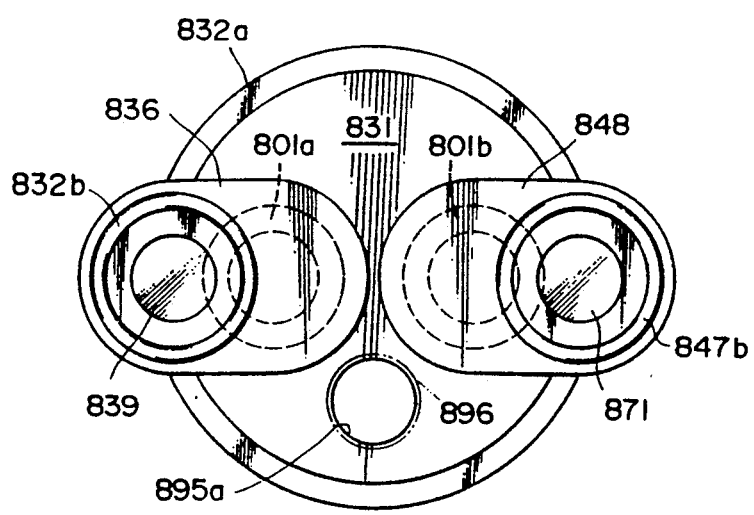
FIG. 57 is a view similar to FIG. 56, but showing a variation of the magnifying lens unit illustrated in FIG. 55.

Alternatively, as shown in FIG. 57, the through bore 895a may be formed in the binocular body 831 at a location adjacent the periphery thereof. The through bore 835 is arranged on a line passing through a location between the pair of image-erecting chamber sections 836 and 848. The arrangement illustrated in FIG. 57 enables the pair of image-erecting chamber sections 836 and 848 to be arranged in close relation to each other, making it possible to reduce the diameter of the objective lens-barrel 832a.

Only the left-hand lens-barrel unit 832 of the binocular illustrated in FIGS. 55 and 56 has been described. However, the same technical concept is applied to the right-hand lens barrel unit 847.

The binocular described above with reference to FIGS. 55 through 56 or FIG. 57 is advantageous in that provision of the single objective lens-barrel 833 common to the left- and right-hand image-erecting chamber sections 836 and 848 enables the focusing mechanism to be simplified in construction. Further, the optical axes l and l' are always maintained stationary during angular movement of the eyepiece lens-barrels 832b and 847b, and the distance between the optical axes l and l' is maintained unchanged. Moreover, the binocular is extremely convenient, because it is provided with the magnifying lens function for viewing various objects to be observed such as insects, postal stamps or the like in an magnified scale. The binocular has other various advantages similar to those mentioned previously.

Figure 58:
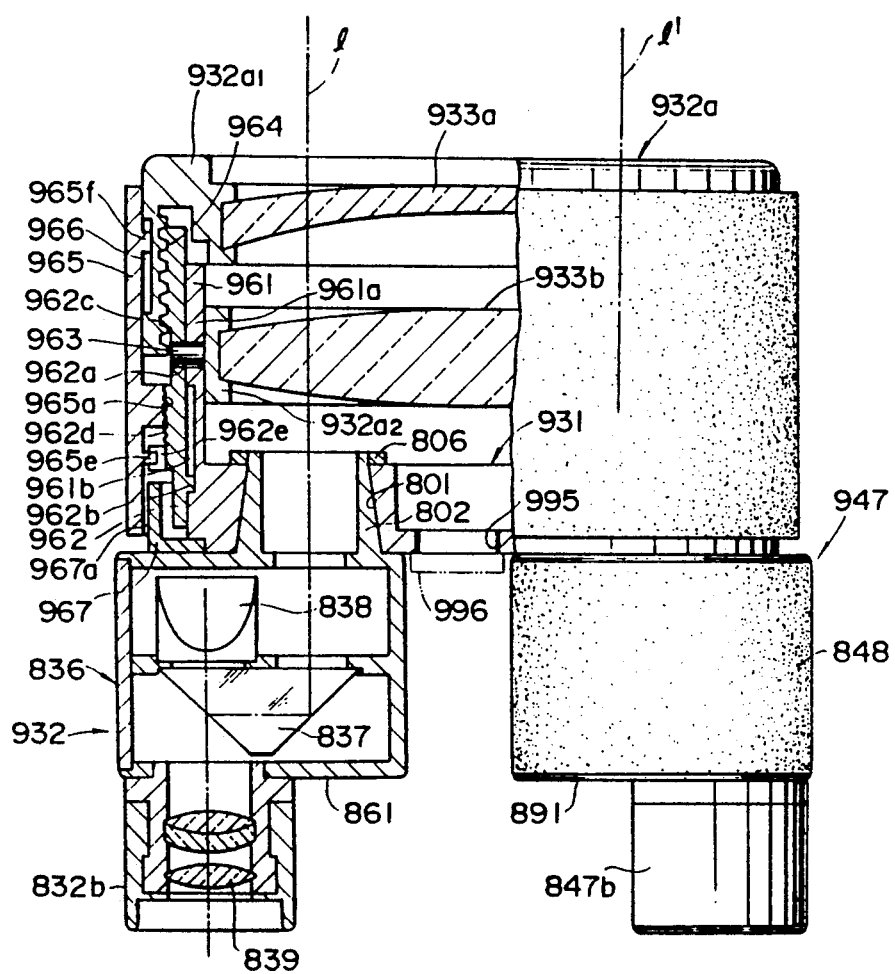
FIG. 58 is a partially cross-sectioned top plan view of a binocular according to another modification of the invention, which comprises a zooming mechanism.
Figure 59:
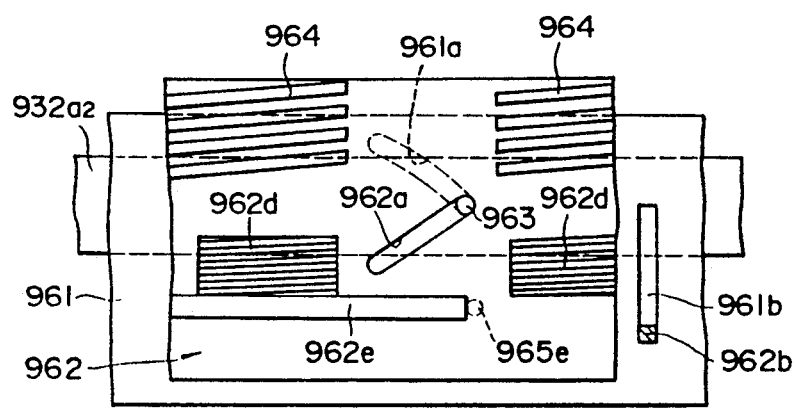
FIG. 59 is a diagrammatic fragmentary developed view of the zooming mechanism illustrated in FIG. 58, showing the objective lens-barrel in a telescopic position.
Figure 60:
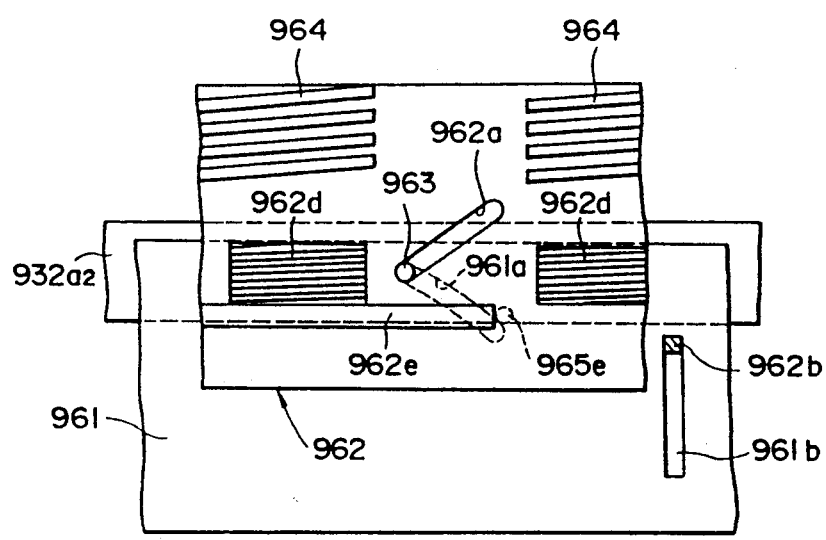
FIG. 60 is a view similar to FIG. 59, but showing the objective lens-barrel in a wide-angle position.

FIGS. 58 through 60 show a modified form of the binocular illustrated in FIGS. 55 and 56. In FIGS. 58 through 60, components and parts like or similar to those illustrated in FIGS. 55 and 56 are designated by the same or like reference numerals, and the description of such like or similar components and parts will therefore be omitted to avoid repetition.

The binocular illustrated in FIGS. 58 through 60 comprises a zoom objective lens-barrel. Specifically, as shown in FIG. 58, the binocular body 931 is integrally provided with a cylindrical wall 961 projecting from the end face of the binocular body 931 remote from the image-erecting chamber sections 836 and 848.

The zoom objective lens-barrel 932a is composed of a pair of inner and outer tubular members $932a_2$ and $932a_1$ in concentric relation to each other. The inner and outer tubular members $932a_2$ and $932a_1$ have incorporated therein their respective objective lens system sections 933b and 933a arranged in coaxial relation to each other. The inner tubular member $932a_2$ is arranged within the cylindrical wall 961 of the binocular body 931 for angular movement relative thereto about the axis of the cylindrical wall 961 and for reciprocative movement relative to the cylindrical wall 961 along the axis thereof. A movable intermediate tubular member 962 is arranged about the outer periphery of the cylindrical wall 961 for reciprocative movement along the axis thereof, but against angular movement relative to the cylindrical wall 961 along the axis thereof.

A cam pin 963 projects radially outwardly from the inner tubular member $932a_2$. The cam pin 963 extends through an elongated guide slot 961a formed in the cylindrical wall 961 of the binocular body 931. A key groove 961b is formed in the outer periphery of the cylindrical wall 961 and serves to allow the movable intermediate tubular member 962 to be linearly and reciprocatively moved relatively to the cylindrical wall 961 along the axis thereof without angular movement thereabout subsequently to be described.

The movable intermediate tubular member 962 is formed therein with an elongated cam slot 962a serving to urge the cam pin 963. The intermediate tubular member 962 is provided on its inner periphery with a key 962b which projects into the key groove 961b formed in the cylindrical wall 961. The intermediate tubular member 962 has one end portion remote from the image-erecting chamber sections 836 and 848. The one end portion of the intermediate tubular member 962 has an outer peripheral surface formed with helicoid threads 962c. The outer tubular member $932a_1$ of the objective lens-barrel 932a has an inner periphery formed with helicoid threads 964 which are threadedly engaged with the helicoid threads 962c on the intermediate tubular member 962. Moreover, the intermediate tubular member 962 has the other end portion adjacent the image-erecting chamber sections 836 and 848. The other end portion of the intermediate tubular member 962 has an outer peripheral surface formed with threads 962d small in pitch which extend circumferentially of the intermediate tubular member 962.

An operating tubular member 965 is arranged about the outer periphery of the movable intermediate tubular member 962, with the outer tubular member $932a_1$ of the objective lens-barrel 932a positioned therebetween. The operating tubular member 965 has an inner periphery formed with threads 965a which are threadedly engaged with the threads 962d on the intermediate tubular member 962. The operating tubular member 965 is provided with a stopper pin 965e projecting radially inwardly. On the other hand, the movable intermediate tubular member 962 is provided on its outer periphery with an arcuate stopper projection 962e extending circumferentially. The stopper pin 965e on the operating tubular member 965 is capable of being abutted against the arcuate stopper projection 962e to determine the angular movement range of the operating tubular member 965.

The operating tubular member 965 is reciprocatively movable together with the movable intermediate tubular member 962 along the axis of the cylindrical wall 961. The operating tubular member 965 is provided with a radially inwardly projecting pin 965f located adjacent the end of the operating tubular member 965 remote from the image-erecting chamber sections 836 and 848. The projecting pin 965f is movable along an axial straight groove 966 formed in the outer periphery of the outer tubular member 932$a_1$ of the objective lens-barrel 933a.

As mentioned previously, the helicoid threads 964 on the outer tubular member 932$a_1$ of the objective lens-barrel 932a are threadedly engaged with the helicoid threads 962c on the movable intermediate tubular member 962. Because of the engagement between the helicoid threads 964 and 962c, angular movement of the operating tubular member 965 about the cylindrical wall 961 causes the outer tubular member 932$a_1$ to be moved reciprocatively along the axis of the cylindrical wall 961, thereby moving the objective lens system section 933a incorporated in the outer tubular member 932$a_1$ toward and away from the objective lens section 933b incorporated in the inner tubular member 932$a_2$.

Additionally, a cover 967 is mounted to the binocular body 931 and has a cylindrical projecting wall 967a which is arranged between the movable intermediate tubular member 962 and the operating tubular member 965.

The operation of the binocular illustrated in FIGS. 58 through 60 will be described with reference to FIGS. 59 and 60. FIG. 59 shows the positional relationship of the cylindrical wall 961, the inner tubular member 932$a_2$ of the objective lens-barrel 932a, and the movable intermediate tubular member 962 when the objective lens-barrel 932a occupies a telescopic position, while FIG. 60 shows the positional relationship of these components when the objective lens-barrel 932a occupies a wide-angle position.

When the operating tubular member 965 is in the position closest to the image-erecting chamber sections 836 and 848 as shown in FIG. 58, the various components are in the positional relationship illustrated in FIG. 59, and the objective lens-barrel 932a is in the telescopic position where the objective lens system sections 933b and 933a incorporated respectively in the inner and outer tubular members 932$a_2$ and 932$a_1$ are reduced in distance therebetween.

As the operating tubular member 965 is linearly moved forwardly away from the image-erecting chamber sections 836 and 848 along the axis of the stationary cylindrical wall 961, the movable intermediate tubular member 962 threadedly engaged with the operating tubular member 965 through the threads 962d and 965a is also moved together therewith, causing the cam slot 962a to urge the cam pin 963. During the forward movement of the operating tubular member 965, the key 962b is moved along the key groove 961b to prevent angular movement of the movable intermediate tubular member 962. That is, the cam pin 963 urged by the cam slot 962a is moved angularly while being guided along the guide slot 961a. This operation gradually increases the distance between the inner tubular member 932$a_2$ of the objective lens-barrel 932a to which the cam pin 963 is mounted, and the outer tubular member 932$a_1$ which is moved together with the operating tubular member 965. In this manner, the zooming operation is carried out which corresponds to the moving position of the operating tubular member 965. As the operating tubular member 965 is moved to a position farthest from the image-erecting chamber sections 836 and 848, the various components occupy their respective positions illustrated in FIG. 59. Thus, the objective lens-barrel 832a occupies the wide-angle position where the distance is long between the objective lens system sections 933b and 933a of the respective inner and outer tubular members 932$a_2$ and 932$l$.

In the wide-angle position, if the operating tubular member 965 is moved in the direction opposite to that described above, i.e., toward the image-erecting chamber sections 836 and 848, the distance between the objective lens system sections 933a and 933b is gradually reduced, so that the objective lens-barrel 932b moves toward the telescopic position.

On the other hand, when the operating tubular member 965 is angular moved relatively to the stationary cylindrical wall 961 about the axis thereof, the operating tubular member 965 is angularly moved about the movable intermediate tubular member 962 within the range in which the stopper pin 965e is restricted by the stopper projection 962e. That is, the operating tubular member 965 is angularly moved while the threads 965a on the operating tubular member 965 are threadedly engaged with the threads 962d on the intermediate tubular member 962 maintained stationary.

As a result, angular movement of the projecting pin 965f on the operating tubular member 965 which projects into the linear groove 966 in the outer tubular member 932$a_1$ causes the same to be angularly moved about the stationary cylindrical wall 961. Because of the threaded engagement between the helicoid threads 962c and 964, the outer tubular member 932$a_1$ is moved reciprocatively along the axis of the cylindrical wall 961. In this manner, angular movement operation of the operating tubular member 965 varies the position of the objective lens system section 933a incorporated in the outer tubular member 932a, relative to the objective lens system section 933b incorporated in the inner tubular member 932$a_2$. Thus, focusing is carried out with respect to the left- and right-hand lens-barrel units 932 and 947.

The binocular illustrated in FIGS. 58 through 60 is also utilized as a magnifying lens unit like the binocular shown in FIGS. 55 and 56. That is, a through bore 995 is formed in the binocular body 931, and is covered with a dust-proof closure 996.

Figure 61:
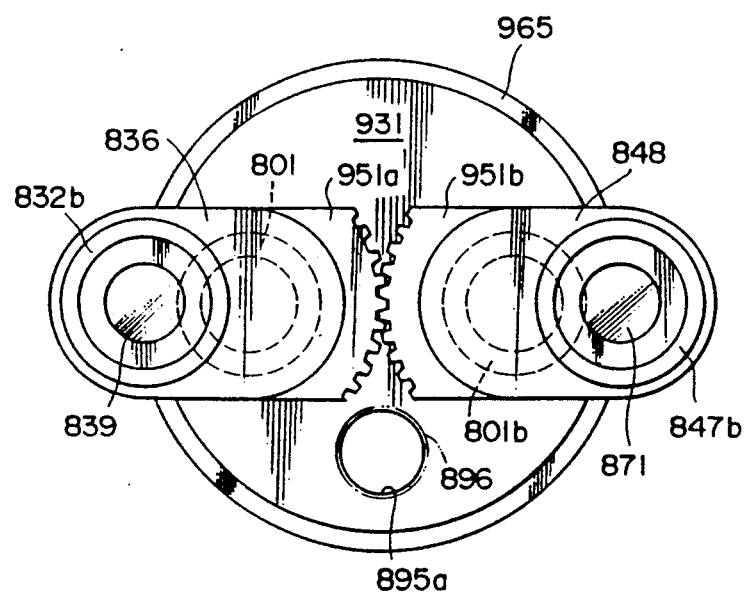
FIG. 61 is a rear elevational view of an improved modification of the binocular illustrated in 58, which comprises an interlocking mechanism.

The binocular illustrated in FIGS. 58 through 60 may comprises an interlocking mechanism like that described previously with reference to FIG. 19. That is, as shown in FIG. 61, the pair of toothed plates 951a and 951b are fixedly mounted respectively to the outer peripheries of the respective image-erecting chamber sections 836 and 848. The toothed plates 951a and 951b are mounted respectively to the image-erecting chamber sections 836 and 848 at respective locations adjacent the end walls 861 and 891 of the respective image-erecting chamber sections 836 and 847. The pair of toothed plates 951a and 951b are in mesh with each other so that the pair of eyepiece lens-barrels 832b and 847b are interlocked with each other.

The binocular described above with reference to FIGS. 58 through 60 or FIG. 61 has advantages similar to those obtained by the binocular illustrated in FIGS. 55 and 56. Furthermore, it is not required for the binocular that a pair of zooming mechanisms be provided respectively for a pair of left- and right-hand objective lens-barrels like the conventional binocular. Accordingly, the binocular of the invention can be simplified in construction.

What is claimed is:

1. A binocular comprising:

a binocular body having end surfaces and an outer upper surface;

a pair of objective lenses and a pair of eyepiece lenses mounted to said binocular body, respective optical axes of said pair of objective lenses extending between said end surfaces of said binocular body;

focusing means mounted to said binocular body for adjusting a distance between said objective lenses and said eyepiece lenses;

wherein said outer upper surface is formed with receiving means and an upwardly open accommodating space adjacent said receiving means, said receiving means comprising a pair of upwardly open aligned and spaced bearing recesses; and wherein said focusing means includes a shaft received in said bearing recesses for movement about an axis of said shaft, an operating means accommodated in said accommodating space and mounted to said shaft for movement therewith about the axis of said shaft, means for adjusting the distance between said objective lenses and said eyepiece lenses, said adjusting means moving in response to the movement of said operating means, said shaft, said operating means, and said adjusting means being formed as a preassembled single unit and inserted into said accommodating space from above, and retaining means mounted to the outer upper surface of said binocular body for preventing said shaft from coming out of said receiving means.

2. The binocular according to claim 1, wherein said shaft has an axis extending parallel to respective optical axes of said pair of objective lenses.

3. The binocular according to claim 1, wherein the operating means comprises an operating roller.

4. The binocular according to claim 3, wherein said shaft comprises a pair of shaft sections protruding respectively from opposite end faces of said operating roller, said shaft sections being formed integrally with said operating roller.

5. The binocular according to claim 3, wherein said retaining means is composed of a cover member having an opening through which said operating roller is partially exposed.

6. The binocular according to claim 1, wherein said accommodating space is between said pair of bearing recesses.

* * * * *